(12) United States Patent
Nishikawa et al.

(10) Patent No.: US 10,576,579 B2
(45) Date of Patent: Mar. 3, 2020

(54) LASER MACHINING APPARATUS THAT MACHINES SURFACE OF WORKPIECE BY IRRADIATING LASER BEAM THEREON

(71) Applicant: BROTHER KOGYO KABUSHIKI KAISHA, Nagoya-shi, Aichi (JP)

(72) Inventors: Yasuo Nishikawa, Nagoya (JP); Yoshihisa Kusumoto, Nagoya (JP)

(73) Assignee: BROTHER KOGYO KABUSHIKI KAISHA, Aichi (JP)

( * ) Notice: Subject to any disclaimer, the term of this patent is extended or adjusted under 35 U.S.C. 154(b) by 20 days.

(21) Appl. No.: 16/144,644

(22) Filed: Sep. 27, 2018

(65) Prior Publication Data

US 2019/0022794 A1    Jan. 24, 2019

Related U.S. Application Data

(63) Continuation-in-part of application No. PCT/JP2016/085716, filed on Dec. 1, 2016.

(30) Foreign Application Priority Data

Mar. 31, 2016   (JP) ................. 2016-070461

(51) Int. Cl.
*G05B 19/4097*    (2006.01)
*B23K 26/03*      (2006.01)
(Continued)

(52) U.S. Cl.
CPC ........ *B23K 26/032* (2013.01); *B23K 26/0622* (2015.10); *B23K 26/082* (2015.10);
(Continued)

(58) Field of Classification Search
CPC .............. B23K 26/032; B23K 26/0861; B23K 26/361; B23K 26/127; B23K 26/082;
(Continued)

(56) References Cited

FOREIGN PATENT DOCUMENTS

| JP | 2007-118051 A | 5/2007 |
|----|---------------|--------|
| JP | 2012-076147 A | 4/2012 |
| JP | 2013-240834 A | 12/2013 |

OTHER PUBLICATIONS

International Search Report and Written Opinion issued in connection with International Patent Application No. PCT/JP2016/085716, dated Jan. 10, 2017. (5 pages).

(Continued)

*Primary Examiner* — Christopher E. Everett
(74) *Attorney, Agent, or Firm* — K&L Gates LLP

(57) ABSTRACT

In a laser machining apparatus, a scanner is configured to scan a laser beam emitted from a laser beam emission device. A first part of a workpiece is exposed through an opening formed in the workpiece. A controller is configured to perform: acquiring shape data indicative of a shape of the workpiece; acquiring machining pattern data indicative of a machining pattern to be machined on the first part; acquiring a length of the machining pattern based on the machining pattern data; calculating an unmachinable position on a setting surface using the length and the shape data, the unmachinable position resulting from a second part of the workpiece hindering the laser beam reaching the first part, at least a part of the machining pattern being unmachinable on the first part in a state where the workpiece is set on the unmachinable position; and displaying the unmachinable position on a display.

9 Claims, 18 Drawing Sheets

(51) Int. Cl.
*B23K 26/352* (2014.01)
*B23K 26/0622* (2014.01)
*B23K 26/082* (2014.01)
*B23K 26/12* (2014.01)
*B23K 26/361* (2014.01)
*B23K 26/08* (2014.01)
*B23K 26/36* (2014.01)
*B23K 101/06* (2006.01)

(52) U.S. Cl.
CPC ...... *B23K 26/0821* (2015.10); *B23K 26/0853* (2013.01); *B23K 26/0861* (2013.01); *B23K 26/127* (2013.01); *B23K 26/352* (2015.10); *B23K 26/36* (2013.01); *B23K 26/361* (2015.10); *G05B 19/4097* (2013.01); *B23K 2101/06* (2018.08); *G05B 2219/45165* (2013.01)

(58) Field of Classification Search
CPC .. B23K 26/0622; B23K 26/352; B23K 26/36; B23K 26/0853; B23K 26/0821; B23K 2101/06; G05B 19/4097; G05B 2219/45165
See application file for complete search history.

(56) References Cited

OTHER PUBLICATIONS

International Preliminary Report on Patentability issued in connection with related PCT Application No. PCT/JP2016/085716, dated Oct. 2, 2018. (6 pages).

FIG. 2A
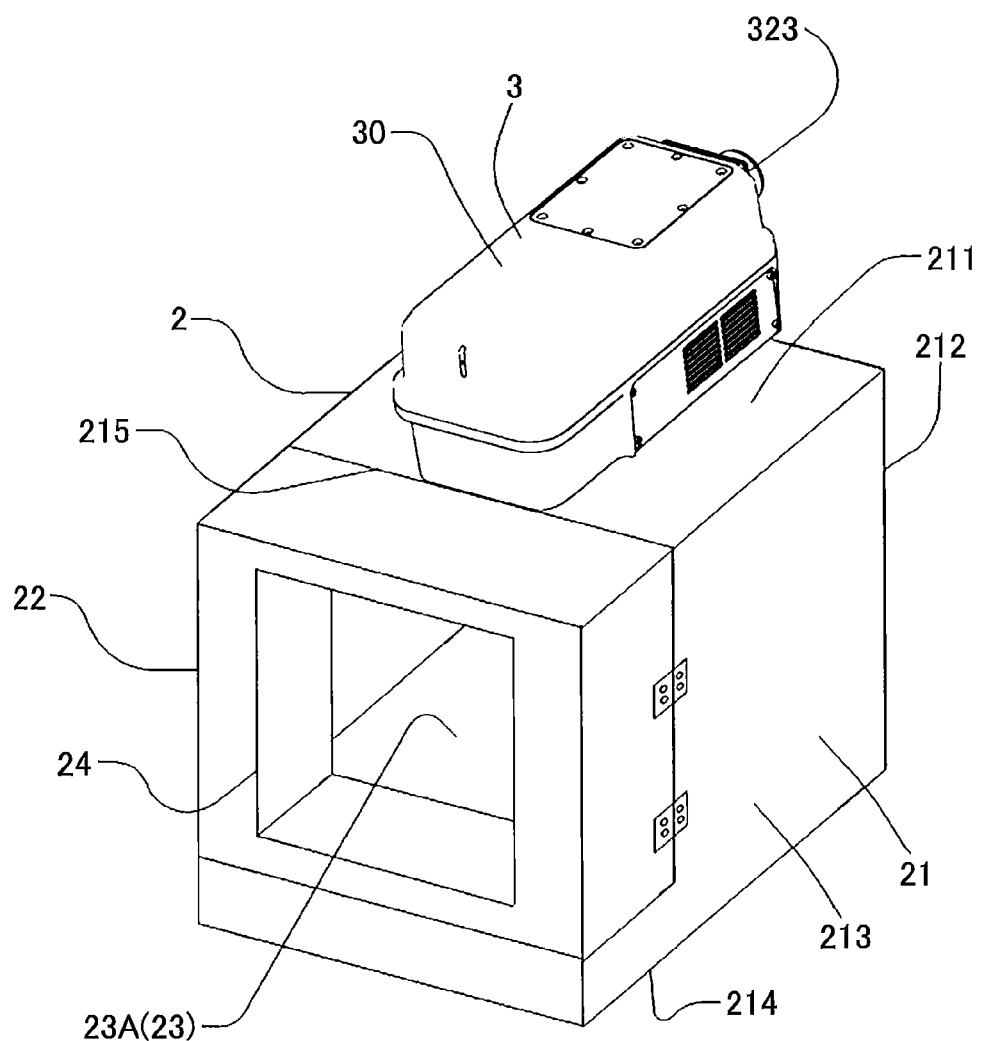
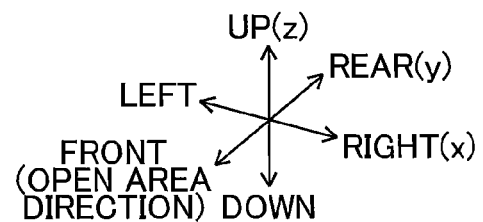

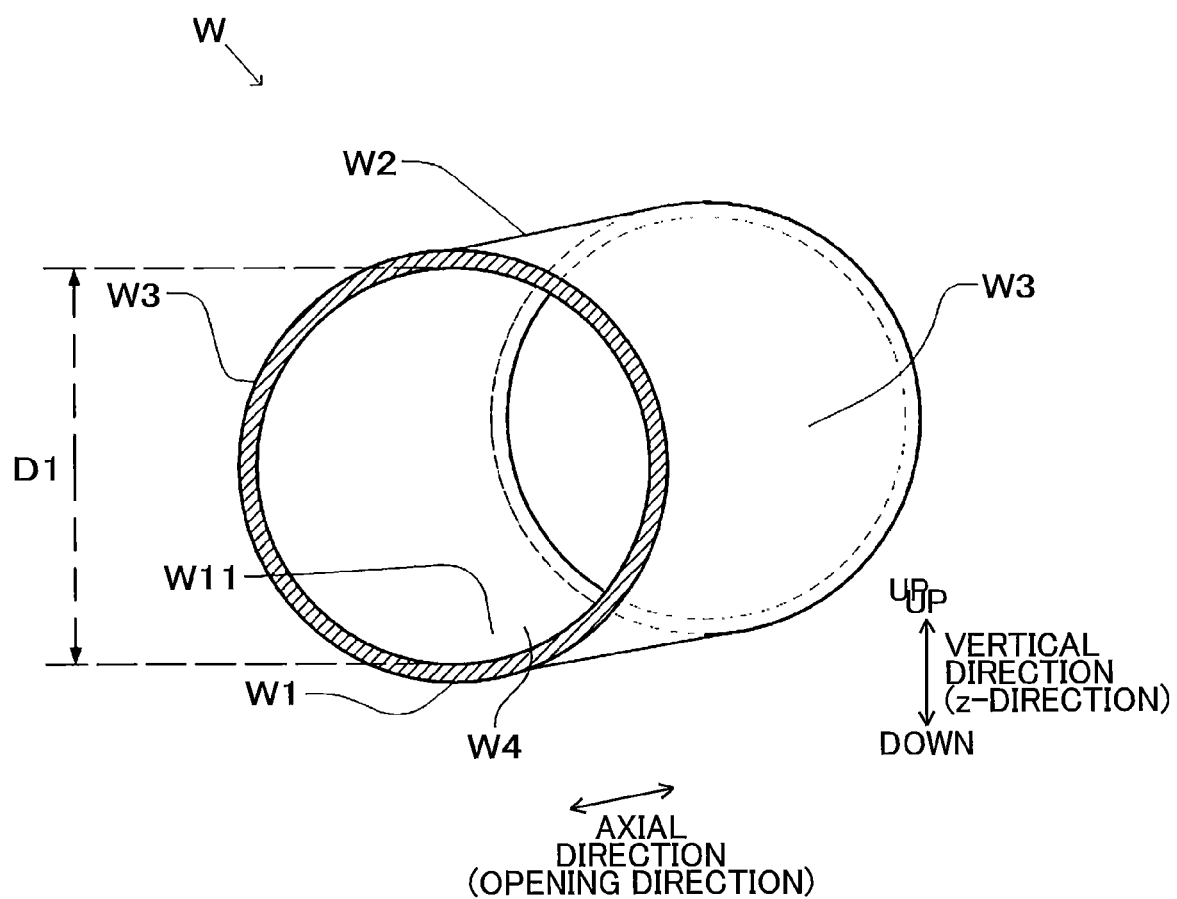

LASER MACHINING APPARATUS THAT MACHINES SURFACE OF WORKPIECE BY IRRADIATING LASER BEAM THEREON

CROSS REFERENCE TO RELATED APPLICATION

This application is a bypass continuation-in-part application of International Application No. PCT/JP2016/085716 filed Dec. 1, 2016 in the Japan Patent Office acting as Receiving Office, claiming priority from Japanese Patent Application No. 2016-070461 filed Mar. 31, 2016. The entire contents of each of these applications are incorporated herein by reference.

TECHNICAL FIELD

The present disclosure relates to a laser machining apparatus for machining the surface of a workpiece by irradiating a laser beam thereon.

BACKGROUND

A conventional laser machining apparatus is provided with a laser emission device, a scanner that scans the laser beam emitted from the laser emission device, and a controller that controls both the laser emission device and the scanner. The laser machining apparatus scans the laser beam with the scanner to perform laser beam machining of a workpiece.

This type of laser machining apparatus can be used to perform laser beam machining on workpieces having three-dimensional shapes. However, when machining three-dimensional workpieces, it is often impossible to machine desired points on the workpiece due to the shape of the workpiece and the direction in which the laser beam is emitted from the scanner toward the workpiece. For example, when a non-targeted part of the workpiece is in the optical path of the laser beam being emitted toward a desired position on the workpiece, the non-targeted part of the workpiece will block the laser beam, preventing the beam from reaching the desired position on the workpiece.

One laser machining apparatus known in the art for machining three-dimensional workpieces is provided with a process condition setting unit for setting conditions for machining a desired pattern, unmachinable region detecting means for detecting unmachinable regions that will result in defective machining when attempting to machine in those regions according to the current machining conditions, and a display unit for displaying the unmachinable regions in a form different from the machinable regions. The unmachinable region detecting means detects both machinable regions and unmachinable regions on the workpiece when the workpiece is disposed in a prescribed position on the basis of the shape of the workpiece (see Japanese Patent Application Publication No. 2007-118051).

With this configuration, the conventional laser machining apparatus can make the user aware of the machinable regions and unmachinable regions on a workpiece prior to irradiating the laser beam. Accordingly, the user can rearrange the machining pattern onto a machinable region to avoid defective machining that would occur if the machining pattern were set in an unmachinable region.

SUMMARY

There is demand to be able to machine patterns at desired positions of workpieces. As an example, when the workpiece has a shape configured of a base part, an overhanging part opposing the base part, and a connecting part connecting the base part to the overhanging part, there are times when it is desirable to machine the base part, which is positioned in the shadow of the overhanging part when viewed from above.

When attempting to machine a desired position such as a position on the base part, the conventional laser machining apparatus must perform the following procedure. First, the conventional laser machining apparatus detects and displays the machinable regions and unmachinable regions of the workpiece while the workpiece is in the prescribed position. When the region of the workpiece to be machined is an unmachinable region, the laser machining apparatus is unable to perform machining in that region. In such cases, the user adjusts the position or angle of the workpiece, and the laser machining apparatus again detects and displays the machinable regions and unmachinable regions on the workpiece on the basis of the new position or angle. This process in which the user modifies the position or angle of the workpiece and the laser machining apparatus detects and displays the machinable and unmachinable regions is repeated until the region of the workpiece to be machined falls within a machinable region. Once a machinable region is found for the machining process, the laser machining apparatus can perform the machining process in this area of the workpiece.

Thus, when attempting to machine desired positions of a workpiece with the conventional laser machining apparatus, the apparatus must repeat the process of detecting and displaying unmachinable regions while the user varies the position of the workpiece. This process of trial and error can be burdensome for the user.

In view of the foregoing, it is an object of the present disclosure to provide a laser machining apparatus having a laser emission device, a scanner, and a controller for machining a desired pattern at a desired position on a workpiece by irradiating a laser beam thereon, and that is capable of notifying the user of set positions for the workpiece at which the desired pattern cannot be machined at the desired position.

In order to attain the above and other objects, the present disclosure provides a laser machining apparatus that includes: a workpiece setting portion; a laser beam emission device; a scanner; a display; and a controller. The workpiece setting portion has a setting surface on which a workpiece is set. The laser beam emission device is configured to emit a laser beam for machining the workpiece. The scanner is configured to scan the laser beam emitted from the laser beam emission device in directions including a first direction. The workpiece has a first part and a second part. The workpiece set on the setting surface has one end portion in a second direction different from the first direction. An opening is formed in the workpiece in a direction opposite the second direction along at least the one end portion. The first part is exposed through the opening. The second part hinders the laser beam scanned in the first direction from reaching the first part. The controller is configured to perform: (a) acquiring shape data indicative of a shape of the workpiece; (b) acquiring machining pattern data indicative of a machining pattern to be machined on the first part; (c) acquiring a first length of the machining pattern in the second direction on the basis of the machining pattern data; (d) calculating an unmachinable position on the setting surface using the first length and the shape data, the unmachinable position resulting from the second part hindering the laser beam reaching the first part, at least a part of the machining pattern being unmachinable on the first part in a state where the workpiece is set on the unmachinable position; and (e) displaying the unmachinable position on the display.

BRIEF DESCRIPTION OF THE DRAWINGS

The particular features and advantages of the disclosure as well as other objects will become apparent from the following description taken in connection with the accompanying drawings, in which:

FIG. 2A is a perspective view illustrating exterior appearance of a laser head unit of the laser machining apparatus and the machining chamber;

FIG. 5 illustrates an example of a workpiece;

FIGS. 6A, 6B, and 6C are explanatory diagrams illustrating printing on an obscured part of the workpiece, in which FIG. 6A is a cross-sectional view of the workpiece at a vertical section passing through a center axis of the workpiece, FIG. 6B is a cross-sectional view of the workpiece at a vertical section that is orthogonal to the section illustrated in FIG. 6A, and FIG. 6C is a cross-sectional view of the workpiece taken at a section shifted from the center axis of the workpiece in a direction perpendicular to an axial direction of the workpiece;

DETAILED DESCRIPTION

Next, a laser machining apparatus according to an embodiment of the present disclosure will be described while referring to the accompanying drawings.

(Overall Structure of Laser Machining System)

Figure 1:
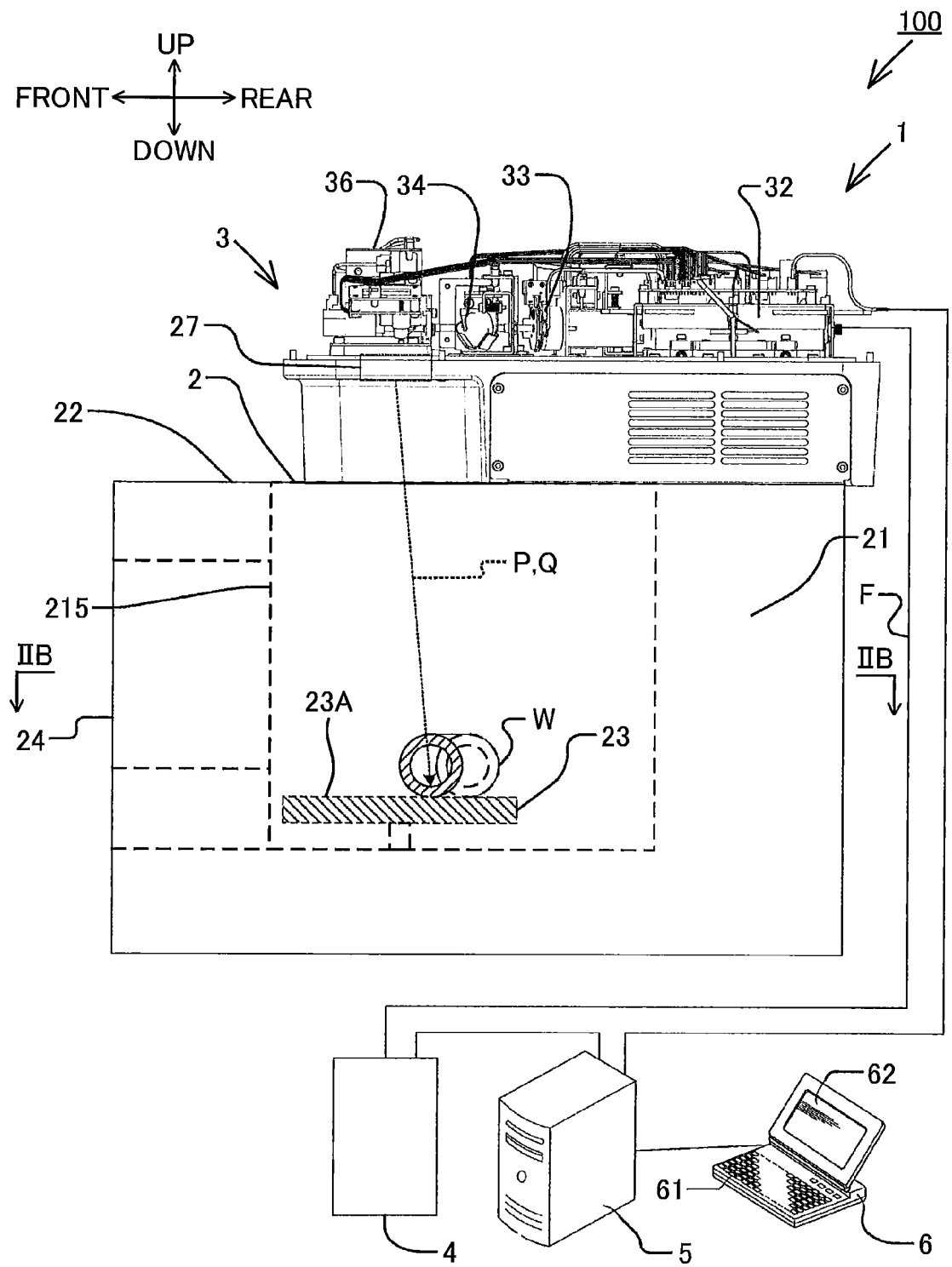
FIG. 1 is a schematic view of a laser machining system provided with a laser machining apparatus and a machining chamber according to one embodiment of the present disclosure.
Figure 2B:
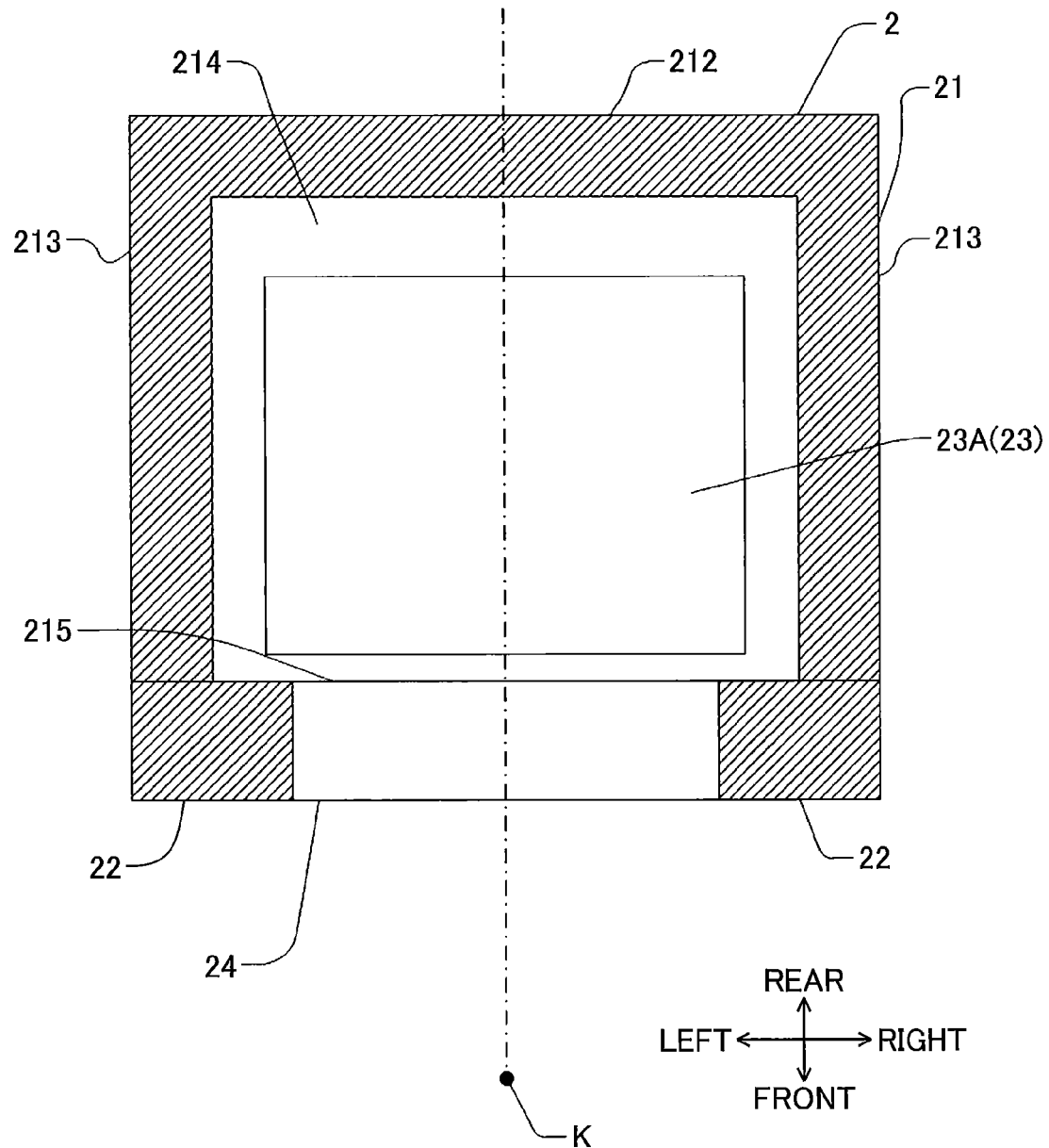
FIG. 2B is a top view of a cross section of the machining chamber taken along a line IIB-IIB depicted in FIG. 1.
Figure 3:
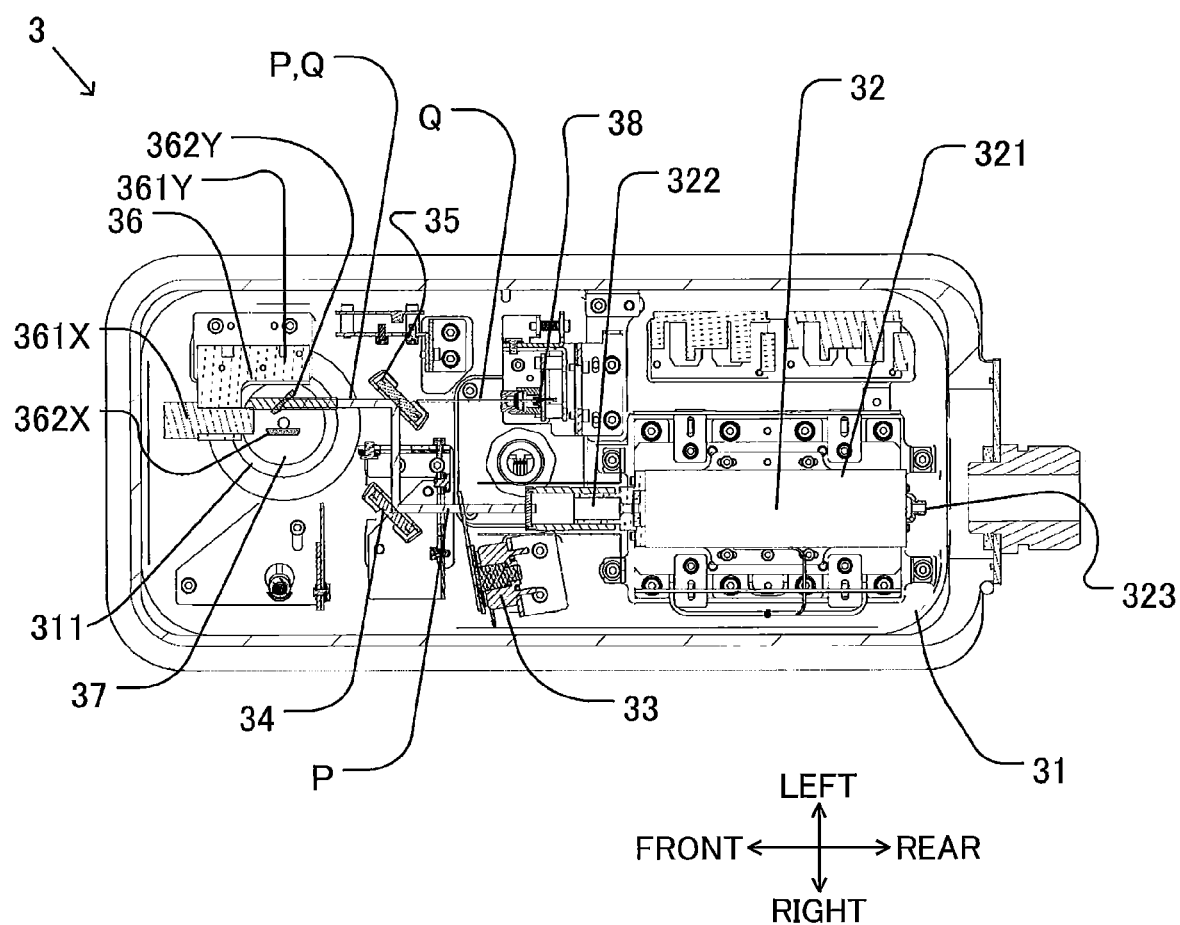
FIG. 3 is a plan view illustrating a structure of the laser head unit in the laser machining apparatus according to the embodiment.

FIG. 1 illustrates a laser machining system 100 that is provided with a laser machining apparatus 1 according to the embodiment. FIG. 2A illustrates a laser head unit 3 included in the laser machining system 100, and a machining chamber 2 on which the laser head unit 3 is mounted. FIG. 2B is a top view of a cross section of the machining chamber 2 taken at a vertical position (along a IIB-IIB line depicted in FIG. 1) aligned with an access opening 24 described later. FIG. 3 is a top view of the laser head unit 3.

The laser machining system 100 provided with the laser machining apparatus 1 according to the present embodiment irradiates a laser beam P toward a workpiece W disposed inside the machining chamber 2. The laser machining system 100 scans the laser beam P irradiated onto the workpiece W within a prescribed scanning range relative to the workpiece W. By scanning the laser beam P, the laser machining system 100 marks the surface of the workpiece W in a process called laser marking.

In the following description, the leftward direction, rightward direction, upward direction, downward direction, direction toward the near side of the drawing, and direction toward the far side of the drawing in FIG. 1 respectively correspond to the forward, rearward, upward, downward, rightward, and leftward directions relative to the laser machining system 100. Consequently, the leftward direction, rightward direction, upward direction, downward direction, direction toward the near side of the drawing, and direction toward the far side of the drawing in FIG. 3 respectively correspond to the forward, rearward, leftward, rightward, upward, and downward directions relative to the laser machining system 100.

The laser machining system 100 is configured of the laser machining apparatus 1, and the machining chamber 2. The laser machining apparatus 1 is configured of the laser head unit 3, a pumping light unit 4, a laser controller 5, and a personal computer (PC) 6.

The laser head unit 3 irradiates the laser beam P and a guide beam Q according to the instructions from the laser controller 5 and scans the laser beam P and guide beam Q over the workpiece W. The laser head unit 3 is configured of a main base 31, a laser oscillation unit 32, a laser shutter unit 33, a turning mirror 34, a dichroic mirror 35, a galvano scanner 36, an fθ lens 37, and a guide beam unit 38. A cover 30 that is shaped substantially like a rectangular parallelepiped covers the components of the laser head unit 3.

The pumping light unit 4 emits pumping light. The pumping light unit 4 is electrically connected to the laser controller 5 and is connected via an optical fiber F to the laser head unit 3. The pumping light unit 4 is configured of a pumping light source and a laser driver (not illustrated). Hence, the laser beam P emitted from the pumping light unit 4 enters the laser head unit 3 via the optical fiber F.

The laser controller 5 is configured of a computer. The laser controller 5 is electrically connected to both the laser head unit 3 and the pumping light unit 4. The laser controller 5 is also electrically connected to the PC 6. The laser controller 5 controls the laser head unit 3 and pumping light unit 4 on the basis of print data and command data received from the PC 6.

As illustrated in FIG. 1, the PC 6 has an input unit 61, and a display unit 62. The PC 6 receives various commands and information regarding the workpiece W via the input unit 61. Various information is displayed on the display unit 62 for the user. The PC 6 transmits print data and command data to the laser controller 5 according to commands received via the input unit 61. The PC 6 also displays the various information on the display unit 62 according to display instruction information received from the laser controller 5.

The laser oscillation unit 32 is fixed to the main base 31 at a position near the rear edge of the laser head unit 3. The laser oscillation unit 32 irradiates the laser beam P in a forward direction on the basis of commands from the laser controller 5.

(Laser Oscillation Unit)

As illustrated in FIG. 3, the laser oscillation unit 32 is configured of a laser oscillator 321, and a beam expander 322. The laser oscillator 321 outputs the laser beam P and is configured of a fiber connector 323, a reflective mirror, a laser medium, a Q-switch unit, an output coupler, a window, a casing, and the like. The fiber connector 323, reflective mirror, laser medium, Q-switch unit, output coupler, and window are disposed inside the casing. The fiber connector 323 is connected to the optical fiber F. The fiber connector 323 receives pumping light irradiated from the pumping light unit 4 via the optical fiber F.

The reflective mirror allows pumping light entering from the fiber connector 323 to pass therethrough, while reflecting the laser beam P outputted from the laser medium with high efficiency. The reflective mirror and the output coupler constitute a laser resonator.

The laser medium is pumped by the pumping light to oscillate the laser beam. Some possible materials that can be used as the laser medium include neodymium-doped gadolinium vanadate (Nd:GdVO4) crystal, neodymium-doped yttrium vanadae (Nd:YVO4) crystal, and neodymium-doped yttrium aluminum garnet (Nd:YAG) crystal.

The output coupler is a partial reflective mirror having a reflectivity of 80 to 90% at a wavelength of 1,064 nm, for example.

The window allows the laser beam P emitted from the output coupler to pass out of the laser oscillator 321.

The Q-switch unit is configured of a passive Q-switch. A passive Q-switch is crystal having low laser beam transmittance when the energy stored in the crystal is low and high laser beam transmittance when the stored energy exceeds a threshold. The passive Q-switch oscillates the laser beam P as a pulsed laser. A saturable absorber such as chromium-doped yttrium aluminum garnet (Cr:YAG) crystal and chromium-doped forsterite (Cr:MgSiO4) crystal may be used as the passive Q-switch.

Note that the internal structure of the laser oscillator 321 is not limited to the structure described above. For example, the reflective mirror and output coupler constituting the laser resonator may be formed as films coated on the laser medium.

The beam expander 322 is disposed on the front end of the laser oscillator 321. The beam expander 322 adjusts the diameter of the oscillated laser beam P emitted from the laser oscillator 321.

(Laser Shutter Unit)

The laser shutter unit 33 is configured of a shutter motor and a shutter. The laser shutter unit 33 is disposed on the front side of the laser oscillation unit 32. The shutter motor is configured of a stepping motor or the like. The shutter is mounted on the motor shaft of the shutter motor and is rotatable thereon. The shutter is rotatable between a blocking position in which the shutter is in the optical path of the laser beam P emitted from the beam expander 322, and a retracted position in which the shutter is retracted from the optical path of the laser beam P. When the shutter is in the retracted position, the laser beam P emitted from the laser oscillation unit 32 is incident on the turning mirror 34.

(Turning Mirror)

As illustrated in FIGS. 1 and 3, the turning mirror 34 is fixed to the main base 31 at a position forward of the laser oscillation unit 32. The turning mirror 34 is disposed in the optical path of the laser beam P emitted from the laser oscillation unit 32. The turning mirror 34 reflects the laser beam P, redirecting the laser beam P in a different direction. The laser beam P reflected by the turning mirror 34 is incident on the dichroic mirror 35 disposed to the left of the turning mirror 34.

(Dichroic Mirror)

As illustrated in FIG. 3, the dichroic mirror 35 is disposed to the left of the turning mirror 34. The reflective surface of the dichroic mirror 35 is at a forty-five degrees angle to the optical path of the laser beam P reflected off the turning mirror 34. The dichroic mirror 35 receives the laser beam P reflected by the turning mirror 34 from the right side and reflects the laser beam P forward. In addition, the guide beam unit 38 is disposed on the rear side of the dichroic mirror 35. The guide beam Q emitted from the guide beam unit 38 is incident on the back surface of the dichroic mirror 35, i.e., the surface on the opposite side of the reflective surface. The dichroic mirror 35 allows transmission of the guide beam Q incident on its back surface. The guide beam Q incident on the back surface of the dichroic mirror 35 is transmitted through the dichroic mirror 35 in the same direction as the laser beam P that is incident on and reflected off the front surface.

(Guide Beam Unit)

The guide beam unit 38 is configured of a visible semiconductor laser that irradiates a visible laser beam, such as a red laser beam. The guide beam unit 38 is disposed on the rear side of the dichroic mirror 35. The guide beam Q emitted from the guide beam unit 38 has a different wavelength from the laser beam P emitted from the laser oscillation unit 32. The guide beam unit 38 is fixed to the main base 31 and is oriented such that the optical path of the guide beam Q transmitted through the dichroic mirror 35 is aligned with the optical path of the laser beam P traveling from the dichroic mirror 35 toward the galvano scanner 36.

(Galvano Scanner)

As illustrated in FIGS. 1 and 3, the galvano scanner 36 is fixed to the main base 31 at a position forward of the dichroic mirror 35. The galvano scanner 36 is disposed in the optical path of the laser beam P that is reflected off the dichroic mirror 35. The galvano scanner 36 receives the laser beam P and guide beam Q from the dichroic mirror 35 and directs the laser beam P and guide beam Q downward. The galvano scanner 36 scans the laser beam P and guide beam Q within a prescribed scanning range.

The galvano scanner 36 has an X-axis galvano motor 361X, a Y-axis galvano motor 361Y, an X-axis galvano mirror 362X retained on the X-axis galvano motor 361X, and a Y-axis galvano mirror 362Y retained on the Y-axis galvano motor 361Y. The X-axis galvano motor 361X and Y-axis galvano motor 361Y are mounted so that the rotation axes of the X-axis galvano motor 361X and Y-axis galvano motor 361Y are orthogonal to each other. The galvano scanner 36 scans the laser beam P and guide beam Q by controlling the rotations of the X-axis galvano motor 361X and Y-axis galvano motor 361Y.

(fθ Lens)

The fθ lens 37 is disposed below the galvano scanner 36. Specifically, the fθ lens 37 is mounted in a through-hole 311 formed in the front end portion of the main base 31. The fθ lens 37 focuses the laser beam P and guide beam Q scanned by the galvano scanner 36. The fθ lens 37 adjusts the focal length of the laser beam P, guide beam Q, and the like to maintain the focal point of the same in a focal plane and corrects the scanning speed of the laser beam P and guide beam Q to a constant speed within the focal plane. Hence, by controlling the rotation of the X-axis galvano motor 361X and Y-axis galvano motor 361Y, the laser machining apparatus 1 can scan the laser beam P and guide beam Q two-dimensionally according to a desired machining pattern D in the front-rear direction (the X-direction) and the left-right direction (the Y-direction) over a desired surface of the workpiece W arranged in the focal plane. Note that the laser beam P and guide beam Q can be scanned two-dimensionally to points that are separated a certain distance from the focal length, provided that the points are within a prescribed depth of focus.

(Machining Chamber)

Next, the general structure of the machining chamber 2 will be described with reference to FIGS. 1, 2A, and 2B. As illustrated in FIGS. 1, 2A, and 2B, the machining chamber 2 includes a boxlike main enclosure 21 that is open on the front side, a door 22 that is pivotably fixed to the front side of the main enclosure 21, and a working platform 23 having a support surface 23A for supporting the workpiece W.

The working platform 23 is disposed inside the main enclosure 21 of the machining chamber 2 and can be moved vertically (along the z-direction illustrated in FIG. 2A). A desired marking surface of the workpiece W supported on the support surface 23A of the working platform 23 can be aligned with the focal plane by adjusting the vertical position of the working platform 23. The main enclosure 21 and door 22 are formed of a material such as steel or stainless steel that is capable of blocking the laser beam P.

The main enclosure 21 is configured of a generally rectangular top surface part 211 on which the laser head unit 3 is disposed, a rectangular rear surface part 212 forming an inner-back wall surface, two rectangular side surface parts 213 forming left and right wall parts, and a bottom surface part 214. An open area is formed in the top surface part 211. The laser beam P and guide beam Q irradiated from the laser head unit 3 enter the main enclosure 21 through the open area. An open area 215 is formed in the front side of the main enclosure 21. The interior of the main enclosure 21 is exposed to the outside of the machining chamber 2 through the open area 215. In the present embodiment, the open area 215 faces in the forward direction. The direction in which the open area 215 of the main enclosure 21 faces, i.e., the forward direction in the present embodiment, is also called an open area direction.

The door 22 is assembled to the main enclosure 21 so as to be pivotable between a closed position for covering the open area 215 from the front side of the main enclosure 21, and an open position for exposing the open area 215. FIGS. 2A and 2B illustrate the machining chamber 2 when the door 22 is in the closed position. A square transparent hole 24 is formed in the approximate center region of the door 22. The transparent hole 24 is sealed by a transparent plate formed of a transparent glass, acrylic plate, or the like that can transmit visible light but does not allow transmission of the laser beam P.

When the door 22 is in the closed position, the laser beam P that enters the machining chamber 2 through the laser head unit 3 cannot leak out of the machining chamber 2 through the open area 215. When the door 22 is in the open position, on the other hand, the interior of the machining chamber 2 is open to the outside via the open area 215. Thus, the user can see inside the machining chamber 2 through the open area 215 when the door 22 is in the open position. Accordingly, when the door 22 is in the open position, the user can look through the open area 215 to see a guide beam pattern formed inside the machining chamber 2 by the guide beam Q that is emitted from the guide beam unit 38 and scanned by the galvano scanner 36. For example, from a virtual viewpoint K illustrated in FIG. 2B, the user can see a guide beam pattern formed inside the machining chamber 2 through the open area 215. The virtual viewpoint K is set to an arbitrary point positioned forward of the open area 215 and within the left-right edges of the open area 215. In FIG. 2B the virtual viewpoint K is positioned on a straight line extending forward through the left-right center of the open area 215. When the door 22 is in the closed position, the user can visually confirm the progress of machining on the workpiece W through the transparent hole 24. When the door 22 is in the open position, the user can also adjust the position and angle of the workpiece W disposed inside the machining chamber 2.

(Circuit Configuration)

Figure 4:
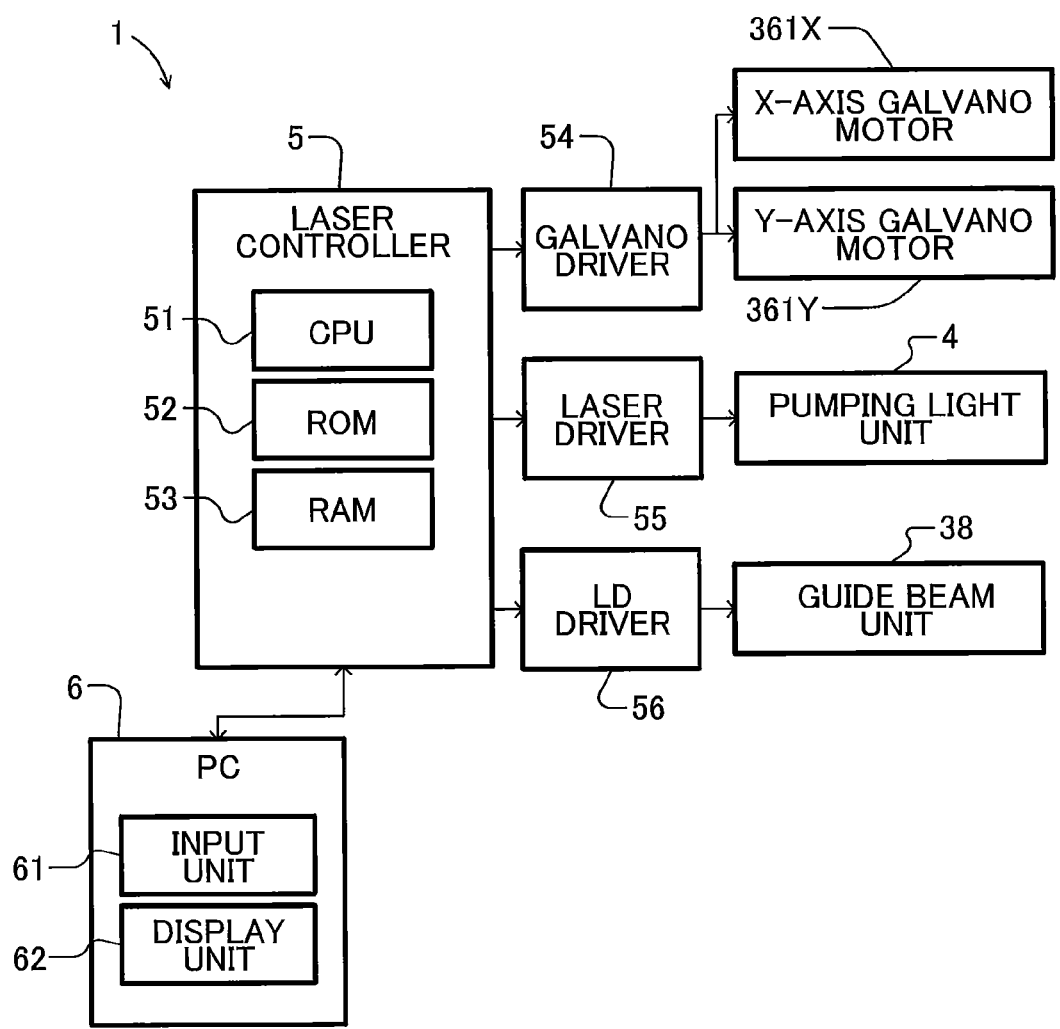
FIG. 4 is a block diagram illustrating a configuration of a control system in the laser machining apparatus according to the embodiment.

Next, the electrical structure of the laser machining apparatus 1 will be described with reference to FIG. 4. As described above, the laser machining apparatus 1 has the laser controller 5 and PC 6. The laser controller 5 and PC 6 are connected to each other and capable of communicating bi-directionally. The laser controller 5 is electrically connected to a galvano driver 54, a laser driver 55, a laser diode (LD) driver 56, the PC 6, and the like. The laser controller 5 performs overall control of the laser machining system 100. The laser controller 5 controls the X-axis galvano motor 361X and Y-axis galvano motor 361Y through the galvano driver 54. The laser controller 5 controls the pumping light unit 4 through the laser driver 55. The laser controller 5 controls the guide beam unit 38 through the LD driver 56. The laser controller 5 also controls the PC 6.

The laser controller 5 has a central processing unit (CPU) 51, a read-only memory (ROM) 52, and a random access memory (RAM) 53. The RAM 53 temporarily stores various results of arithmetic operations performed by the CPU 51, x- and y-coordinate data for machining patterns, and the like. The RAM 53 also stores various inputted data including data related to the shape of the workpiece W, and data related to a set angle $\theta a$ of the workpiece W. Here, the set angle $\theta a$ is the angle formed by a direction that an opening W4 (described later) of the workpiece W faces with respect to the open area direction that the open area 215 in the main enclosure 21 faces. The ROM 52 stores various programs described later, including a laser machining program, a program for setting a printable region, a program for setting a recommended printing region, a program for setting a visible region, a program for setting a second printable region, a program for setting a recommended printing region, and a printing program.

The ROM 52 also stores correlations between x- and y-coordinates and incident angles $\phi a$ of the laser beam P traveling from the laser head unit 3 to the x- and y-coordinates. More specifically, an incident angle $\phi a$ indicates an angle formed by the laser beam P traveling from the laser head unit 3 to the correlated x- and y-coordinates with respect to the vertical direction (z-direction). Here, the x- and y-coordinates indicate a position on the support surface 23A, as described later. The ROM 52 also stores a correction formula for correcting these correlations to calculate an incident angle $\phi$ of the laser beam P traveling from the laser head unit 3 to a position a prescribed distance above the x- and y-coordinates in the z-direction. The CPU 51 performs various arithmetic and control processes according to the programs stored in the ROM 52.

The CPU 51 also outputs galvano drive data set on the basis of print data inputted from the PC 6 to the galvano driver 54. The CPU 51 outputs laser drive data for the laser oscillation unit 32 set on the basis of the print data inputted from the PC 6 to the laser driver 55. The CPU 51 outputs guide beam unit drive data for the guide beam unit 38 set on the basis of data inputted from the PC 6 to the LD driver 56.

The CPU 51 also sets a printable region 81, an unprintable region 80, a recommended region 84, and the like according to various programs and on the basis of data inputted from the PC 6, including the machining pattern D, the shape of the workpiece W, and the set angle $\theta_a$ of the workpiece W. The printable region 81 specifies a set position of the workpiece W at which the desired position on the workpiece W can be printed. The unprintable region 80 specifies the set position of the workpiece W at which the desired portion on the workpiece W cannot be printed. The recommended region 84 specifies the set position of the workpiece W for which the desired position on the workpiece W can be printed at the prescribed set angle $\theta_a$ and for which the desired position is visible to the user. The CPU 51 outputs display command signals to the PC 6 for controlling the display unit 62 to display the printable region 81, unprintable region 80, recommended region 84, and the like.

The galvano driver 54 controls the X-axis galvano motor 361X and Y-axis galvano motor 361Y on the basis of the galvano drive data inputted from the CPU 51. Through this control, the galvano scanner 36 scans the laser beam P.

The laser driver 55 controls the pumping light unit 4 on the basis of the laser drive data inputted from the CPU 51. Through this control, the pumping light unit 4 outputs pumping light.

The LD driver 56 controls the guide beam unit 38 on the basis of the guide beam unit drive data inputted from the CPU 51. Through this control, the guide beam unit 38 outputs the guide beam Q.

As illustrated in FIG. 1, the PC 6 has the input unit 61 that enables the user to input commands and various data including the machining pattern D, information related to the shape of the workpiece W, and the set angle $\theta_a$ of the workpiece W. The input unit 61 is configured of a keyboard, a mouse, and the like. The PC 6 controls the laser controller 5 on the basis of commands inputted through the input unit 61. As illustrated in FIG. 1, the PC 6 also has the display unit 62. The display unit 62 is a liquid crystal display for displaying information including the printable region 81, the unprintable region 80, the recommended region 84, and the like.

The PC 6 controls the display unit 62 on the basis of the display command data inputted from the CPU 51. Through this control, the display unit 62 displays the printable region 81, unprintable region 80, recommended region 84, and the like.

Next, a process performed with the laser machining system 100 according to the present embodiment will be described with reference to FIGS. 5, 6A, 6B, 6C, and 7. The workpiece in this example is a hollow cylindrical-shaped workpiece W. The process involves irradiating the laser beam P onto a desired position in an obscured part W11 of the workpiece W to machine a desired machining pattern D in the desired position of the obscured part W11.

Figure 6A:
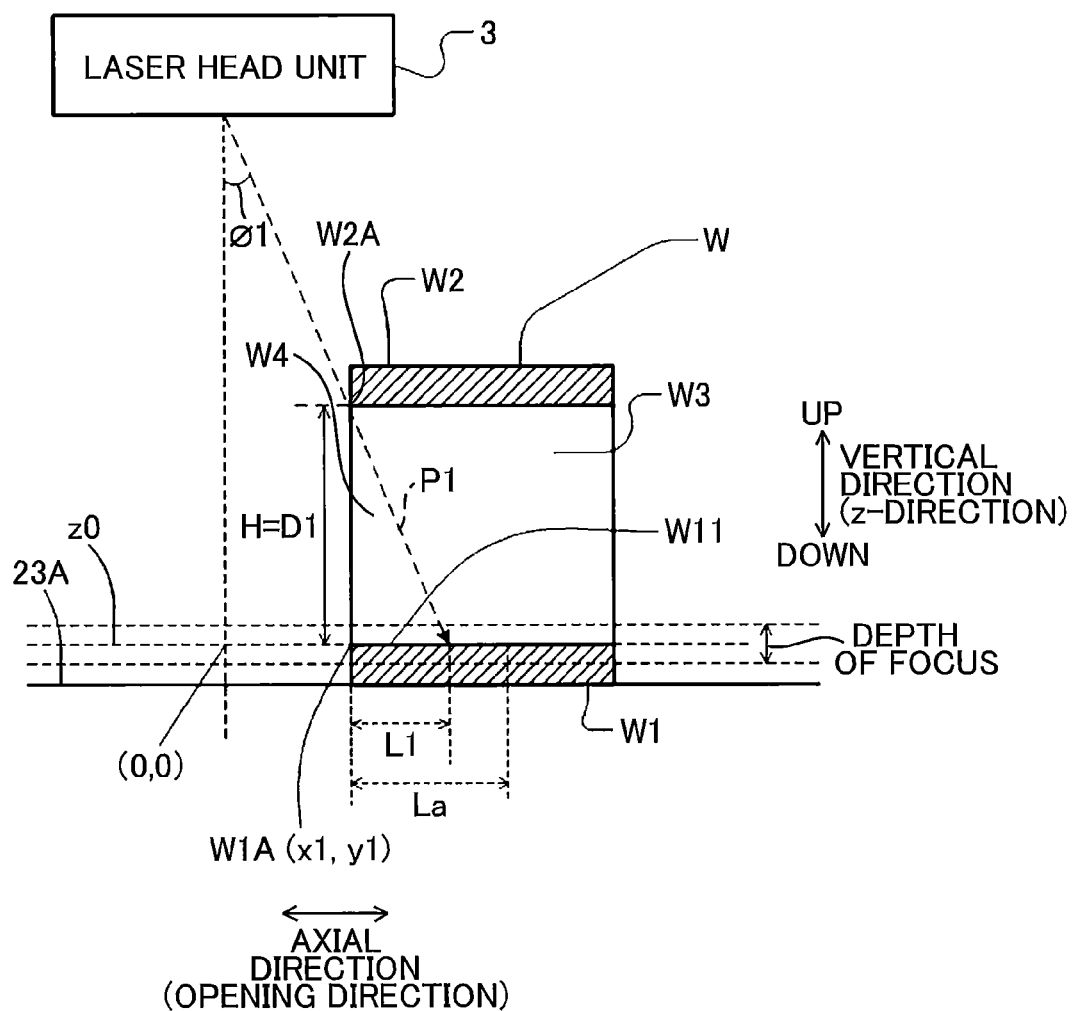
Figure 6B:
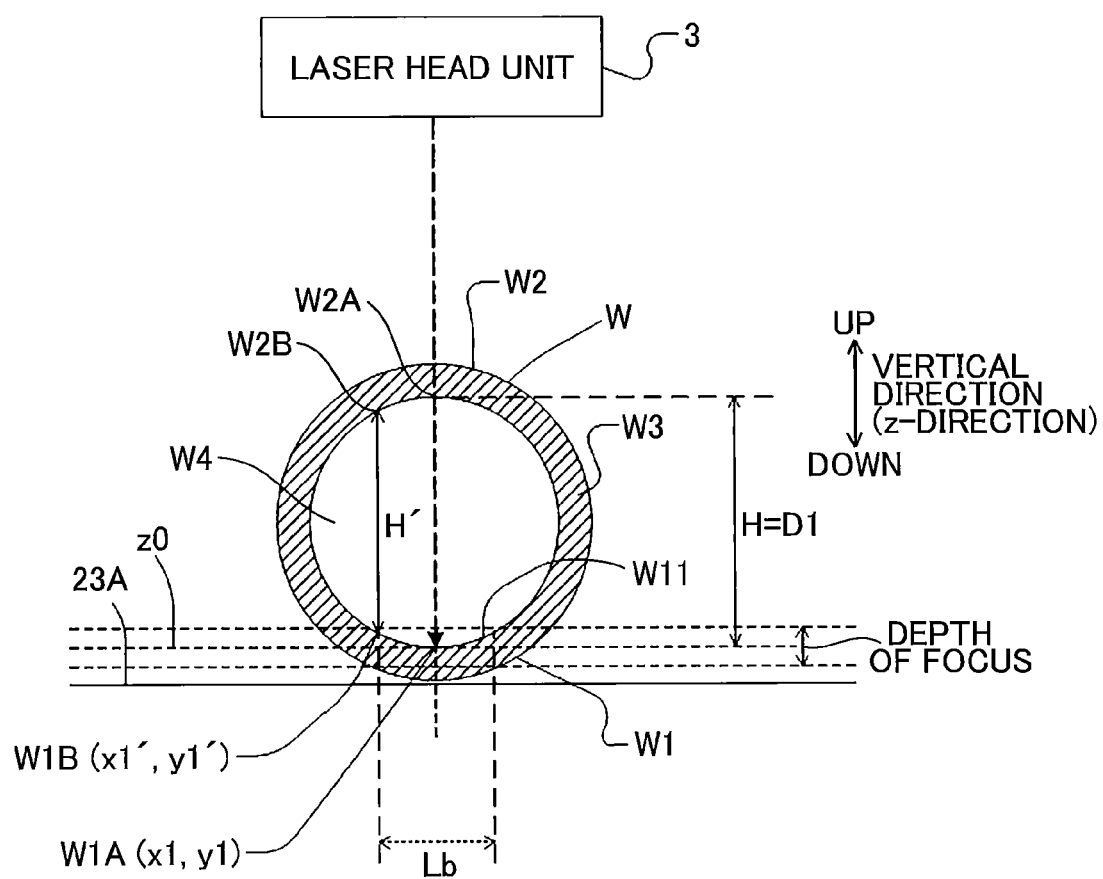
Figure 6C:
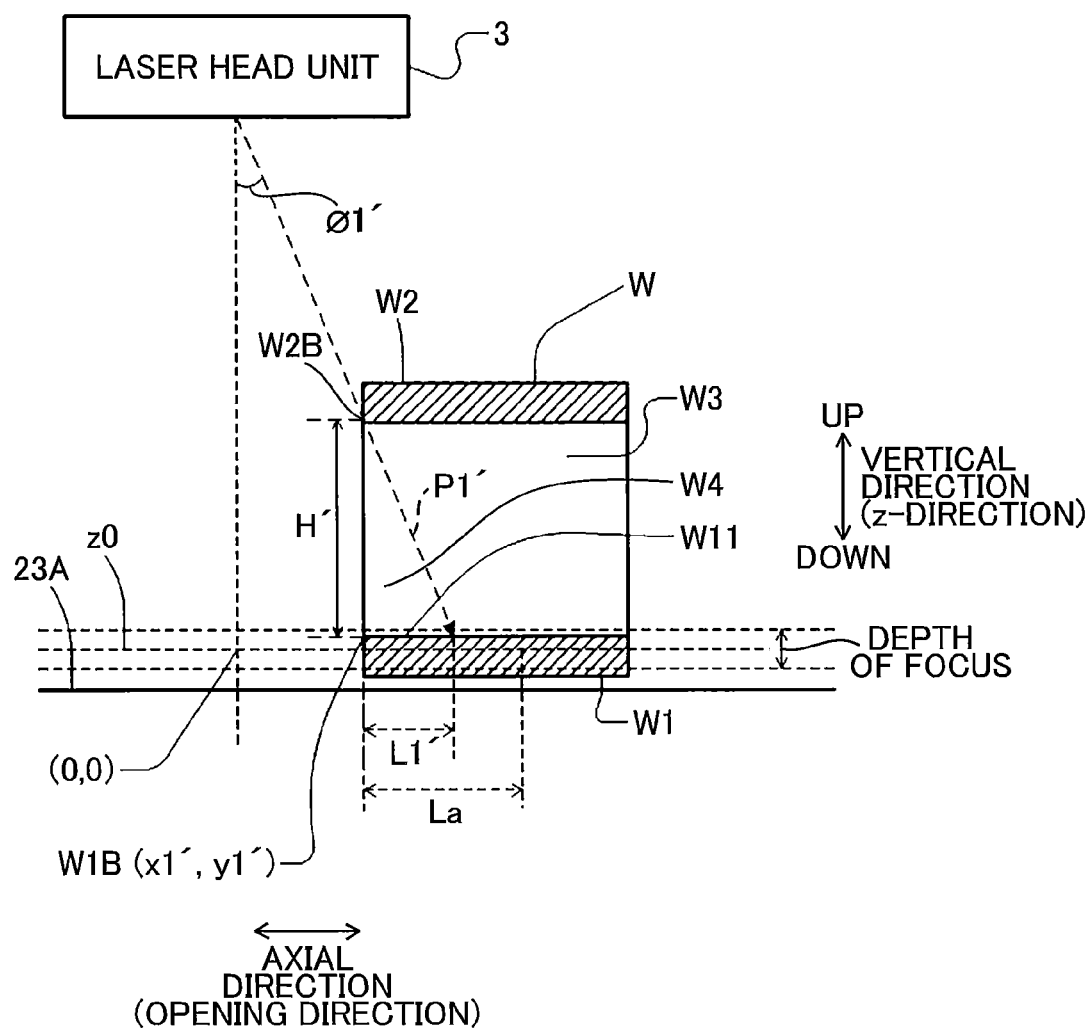
Figure 7:
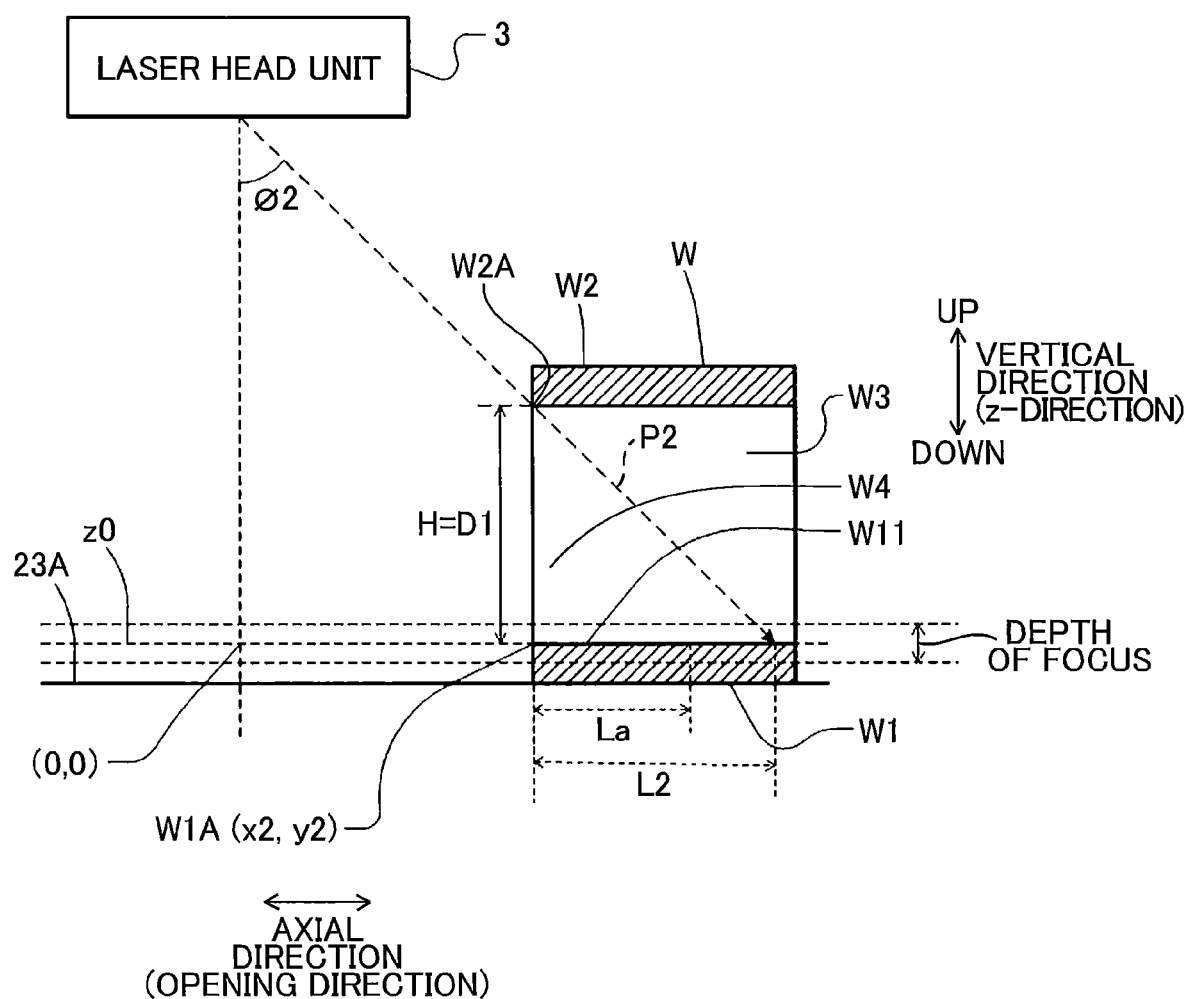
FIG. 7 is an explanatory diagram illustrating printing on the obscured part of the workpiece, and is a cross-sectional view of the workpiece at a vertical section passing through the center axis of the workpiece disposed a different position from that of the workpiece illustrated in FIGS. 6A to 6C.

FIG. 5 illustrates the hollow cylindrical-shaped workpiece W. FIGS. 6A, 6B, 6C, and 7 illustrate cross-sectional views of the hollow cylindrical-shaped workpiece W. FIGS. 6A, 6B, and 6C are explanatory diagrams illustrating the trajectory of the laser beam P when the workpiece W is disposed at coordinates (x1, y1) described later. FIG. 6A is a cross-sectional view of the workpiece W at a vertical section passing through the center axis of the workpiece W when the axial direction of the workpiece W is oriented in the left-right direction of the drawing. Note that the left-right direction of FIG. 6A is the left-right direction relative to the laser machining system 100, that is, in FIG. 6A, the workpiece W is disposed so that the axial direction of the same is oriented in the left-right direction relative to the laser machining system 100. FIG. 6B is a cross-sectional view of the workpiece W at a vertical section that is orthogonal to the section in FIG. 6A such that the axial direction of the workpiece W is orthogonal to the surface of the drawing. The left-right direction of FIG. 6B is the front-rear direction relative to the laser machining system 100. FIG. 6C is a cross-sectional view of the workpiece W taken at a section shifted Lb/2 from the center axis of the workpiece W in a direction perpendicular to the axial direction and parallel to the support surface when the axial direction of the workpiece W is aligned with the left-right direction of the drawing. Here, Lb is the width dimension of a machining pattern D described later. FIG. 7 is an explanatory diagram illustrating the trajectory of the laser beam P when the workpiece W is disposed at coordinates (x2, y2).

These drawings employ an x-y coordinate system in which the x-axis corresponds to the left-right direction in FIGS. 1, 2A, 2B, and 3 and the y-axis corresponds to the front-rear direction in FIGS. 1, 2A, 2B, and 3, and the point of origin (0, 0) is assumed to be the position on the support surface 23A intersected by the laser beam P when the laser beam P is irradiated vertically downward from the laser head unit 3 to the working platform 23.

FIGS. 6A, 6B, 6C, and 7 illustrate the state of the laser machining system 100 after the vertical position of the working platform 23 has been adjusted so that the obscured part W11 of the workpiece W, which is the machining surface to be described later, is aligned with the focal plane z0. The laser beam P may be considered to be in focus within a fixed vertical range relative to the focal plane z0. The vertical length of the range in which the laser beam P is considered to be in focus is called the depth of focus. The depth of focus is determined by characteristics of the optical system. In reality, the vertical length of the printable range is determined not only by the depth of focus, but also by the material properties of the workpiece W. However, in the present embodiment, the vertical range in which machining of the workpiece W is possible will simply be called the depth of focus.

Here, the meaning that the workpiece W is disposed at the coordinates (x1, y1) or the coordinates (x2, y2) is that the workpiece W is placed on the support surface 23A so that an edge W1A of the workpiece W (described later) is disposed at the coordinates (x1, y1) as illustrated in FIGS. 6A and 6B or the coordinates (x2, y2) as illustrated in FIG. 7.

As illustrated in FIGS. 5, 6A, 6B, 6C, and 7, the workpiece W has a hollow cylindrical shape, as described above. An opening W4 is formed in one axial end of the cylinder. An opening is also formed in the other axial end of the cylinder. The workpiece W is oriented so that the axial direction of the cylinder is parallel to the support surface 23A. The workpiece W is configured of a first part W1 constituting the portion of the workpiece W nearest the support surface 23A, a second part W2 constituting the portion of the workpiece W farthest from the support surface 23A, and third parts W3 constituting the side portions of the workpiece W that connect the first part W1 to the second part W2. The opening W4 is defined the edge of the workpiece W. The first part W1 includes an edge W1A closest to the support surface 23A, and the second part W2 includes an edge W2A farthest to the support surface 23A.

More specifically, the first part W1 extends from the portion contacting the support surface 23A to the inner circumferential surface of the cylinder that is within the depth of focus. The second part W2 constitutes the portion vertically opposing the first part W1, and the third parts W3 constitute the portions connecting the first part W1 to the second part W2. The first part W1 has a surface (inner circumferential surface) positioned within the depth of focus. The second part W2 is disposed above the first part W1 and opposes the same vertically. The length of the first part W1 in the axial direction of the cylinder is equivalent to the length of the second part W2 in the same direction.

When viewed from above, the first part W1 is aligned with the second part W2 while the workpiece W is oriented with the axial direction of its cylinder parallel to the support surface 23A. The inner circumferential surface of the first part W1 positioned within the depth of focus is overlapped by the second part W2 when viewed from above and constitutes the obscured part W11. Consequently, a laser beam P irradiated vertically downward from the laser head unit 3 toward the working platform 23, when the workpiece W is disposed in the path of the laser beam P, would be incident on the second part W2 before reaching the first part W1. The following description assumes that a machining pattern D having a height dimension La in the x-direction and a width dimension Lb in the y-direction is to be printed (machined) on the inner circumferential surface of the first part W1 (i.e., on the obscured part W11) such that the height dimension La is aligned in the axial direction of the workpiece W.

As described above, the inner circumferential surface of the first part W1 is positioned within the depth of focus. The inner circumferential surface of the first part W1 constitutes the obscured part W11, which is blocked by the second part W2 in a top view. Depending on the position in which the workpiece W is set, the laser beam P emitted from the laser head unit 3 may be incident on the second part W2 before reaching the inner circumferential surface of the first part W1. Therefore, it is difficult to position the workpiece W so that the laser beam P can reach the entire inner circumferential surface of the first part W1, making the obscured part W11 difficult to print.

However, as illustrated in FIGS. 6A, 6B, 6C, and 7, the laser beam P irradiated from the laser head unit 3 can travel in a direction that slopes at a greater angle to the vertical when directed farther away from the origin (0, 0). Accordingly, by disposing the workpiece W at a position farther away from the origin (0, 0), the laser beam P can be irradiated through the opening W4 of the workpiece W and onto the obscured part W11 of the first part W1 in order to print the obscured part W11. Since the obscured part W11 in this example is positioned entirely within the depth of focus, a laser beam P that reaches the obscured part W11 can machine the obscured part W11.

Here, the region of the obscured part W11 that the laser beam P can reach has an axial length L. The axial length L varies according to the coordinate position at which the workpiece W is disposed and a height H from the inner circumferential surface of the first part W1 to the inner circumferential surface of the second part W2. The height H is equivalent to the height of the opening W4 in the vertical direction (z-direction), i.e., the inner diameter D1 of the opening W4 of the hollow cylindrical-shaped workpiece W in the present embodiment.

When the workpiece W is disposed at a coordinate position (x1, y1), as indicated in FIGS. 6A, 6B, and 6C, the laser beam P can reach a distance L1 from the open end of the cylinder in the cross-section of FIG. 6A (i.e., in the vertical plane passing through the center axis of the workpiece W). The distance L1 is calculated from the equation L1=H×tan $\phi1$. Here, the incident angle $\phi1$ indicates an incident angle of the laser beam P traveling from the laser head unit 3 to the inner circumferential surface of the first part W1 via the edge W2A of the inner circumferential surface of the second part W2 in the cross-section of FIG. 6A (laser beam P1 illustrated in FIG. 6A). More specifically, the incident angle $\phi1$ is an angle formed by the above-described laser beam P1 with respect to the vertical direction (z-direction), as illustrated in FIG. 6A. The edge W2A is positioned at the same coordinate position (x1, y1) as that of the edge W1A in the x- and y-directions but a distance H above the edge W1A in the z-direction.

When the workpiece W is disposed at the coordinate position (x1, y1) illustrated in FIGS. 6A, 6B, and 6C, the laser beam P can reach a distance L1' from the open end of the cylinder in the cross-section of FIG. 6C (i.e., in the vertical plane shifted Lb/2 in a direction perpendicular to the axial direction of the workpiece W from the vertical plane passing through the center axis of the workpiece W). The distance L1' is calculated from the equation L1'=H'×tan $\phi1$'. Here, H' is the height from the inner circumferential surface of the first part W1 to the inner circumferential surface of the second part W2 in the cross-section of FIG. 6C. Here, the incident angle $\phi1$' indicates an incident angle of the laser beam P traveling from the laser head unit 3 to the inner circumferential surface of the first part W1 via an edge W2B of the inner circumferential surface of the second part W2 in the cross-section of FIG. 6C (laser beam P1' illustrated in FIG. 6C). More specifically, the incident angle $\phi1$' is an angle formed by the above-described laser beam P1' with respect to the vertical direction (z-direction), as illustrated in FIG. 6C. The edge W2B is positioned at the same coordinate position (x1, y1) as that of the edge W2A of the inner circumferential surface of the first part W1 in the cross-section of FIG. 6C in the x- and y-directions but a distance H' above the edge W2A in the z-direction.

When the workpiece W is disposed at the coordinate position (x2, y2) illustrated in FIG. 7, the laser beam P can reach a distance L2 from the open end of the cylinder. L2 is calculated from the equation L2=H×tan $\phi2$. Here, the incident angle $\phi2$ indicates an incident angle of the laser beam P traveling from the laser head unit 3 to the inner circumferential surface of the first part W1 via the edge W2A in the cross section of FIG. 7 which is the vertical plane passing through the center axis of the workpiece W (laser beam P2 illustrated in FIG. 7). More specifically, the incident angle $\theta2$ is an angle formed by the above-described laser beam P2 with respect to the vertical direction (z-direction), as illustrated in FIG. 7.

Thus, the distance L from the edge W1A of the cylinder at which the laser beam P can reach is determined on the basis of the height H from the inner circumferential surface of the first part W1 to the inner circumferential surface of the second part W2. The distance L is also determined on the basis of the coordinate position of the workpiece W. Consequently, it is possible to determine whether a machining pattern having the height dimension La can be printed on the inner circumferential surface of the first part W1 by comparing the axial length L for the region in the obscured part W11 that is reachable by the laser beam P to the height dimension La of the machining pattern D.

When the workpiece W is disposed at the coordinate position (x1, y1) illustrated in FIGS. 6A, 6B, and 6C, the axial length L1 for the region of the obscured part W11 that is reachable by the laser beam P is shorter than the height dimension La of the machining pattern D. Consequently, the machining pattern D having the height dimension La cannot fit within the reachable region on the obscured part W11. Thus, the machining pattern D having the height dimension La cannot be printed in the obscured part W11 in its entirety.

However, when the workpiece W is disposed at the coordinate position (x2, y2) illustrated in FIG. 7, the axial length L2 for the reachable range of the obscured part W11 is larger than the height dimension La of the machining pattern D. Therefore, the machining pattern D having the height dimension La can fit in the reachable region of the obscured part W11. Accordingly, the machining pattern D having the height dimension La can be printed in the obscured part W11. Thus, it is possible to determine whether a machining pattern D with the height dimension La is printable or not printable on the basis of the coordinate position at which the workpiece W is disposed.

Further, when the workpiece W is disposed at the coordinate position (x1, y1) illustrated in FIGS. 6A, 6B, and 6C, the axial length L1 for the region of the obscured part W11 that is reachable by the laser beam P in the cross-section of FIG. 6A is longer than the axial length L1' for the region of the obscured part W11 that is reachable by the laser beam P in the cross-section of FIG. 6C. Therefore, it is possible to determine whether or not the entire machining pattern D can be printed for the coordinate position at which the workpiece W is positioned by calculating the axial length L' of the reachable region in a plane shifted a distance Lb/2 from the center axis in a direction orthogonal to the axial direction and parallel to the support surface, as illustrated in the cross-section of FIG. 6C, and by comparing this axial length L1' to the height dimension La of the machining pattern D aligned with the axial direction of the workpiece W. In this way, it is possible to determine more accurately whether or not printing is possible than when using the axial length L along the vertical plane passing through the center axis of the workpiece W.

(Flowcharts)

Next, the process implemented by a laser machining program (laser machining process) executed by the CPU 51 of the laser controller 5 will be described in detail with reference to FIGS. 8 to 16. As described above, the laser machining program is stored in the ROM 52 of the laser controller 5. The CPU 51 reads the program from the ROM 52 and executes the process.

Figure 8:
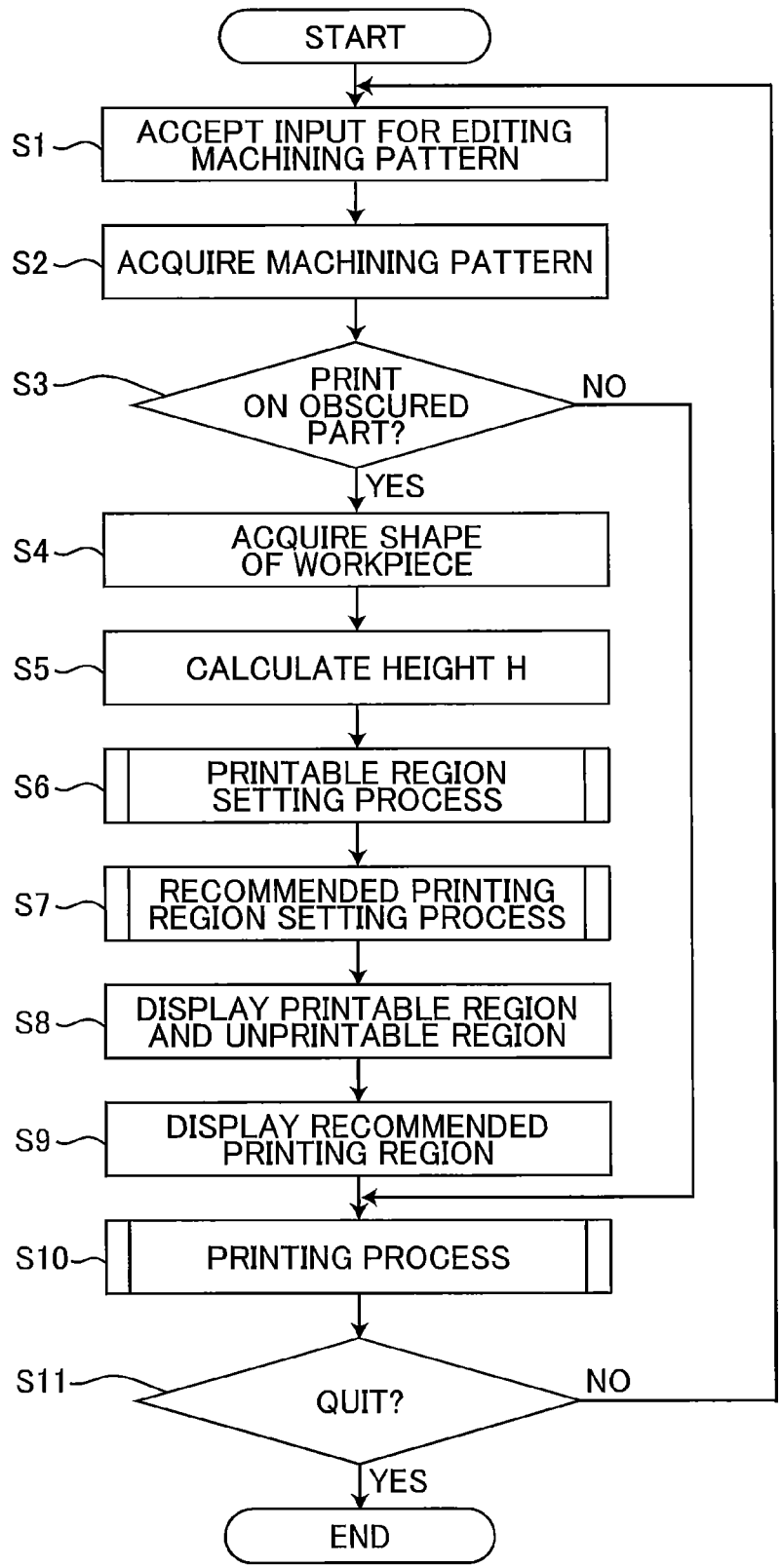
FIG. 8 is a flowchart illustrating steps in a laser machining process according to the embodiment.

When the power for the laser machining apparatus 1 is turned on, in S1 of FIG. 8 the CPU 51 accepts input for editing the machining pattern D. Specifically, the CPU 51 starts editing the machining pattern D when the user operation is made on the input unit 61 to input an edit command, for example. The CPU 51 also controls the PC 6 to display a reception screen 90 such as that illustrated in FIG. 15 on the display unit 62 in the present embodiment.

Figure 15:
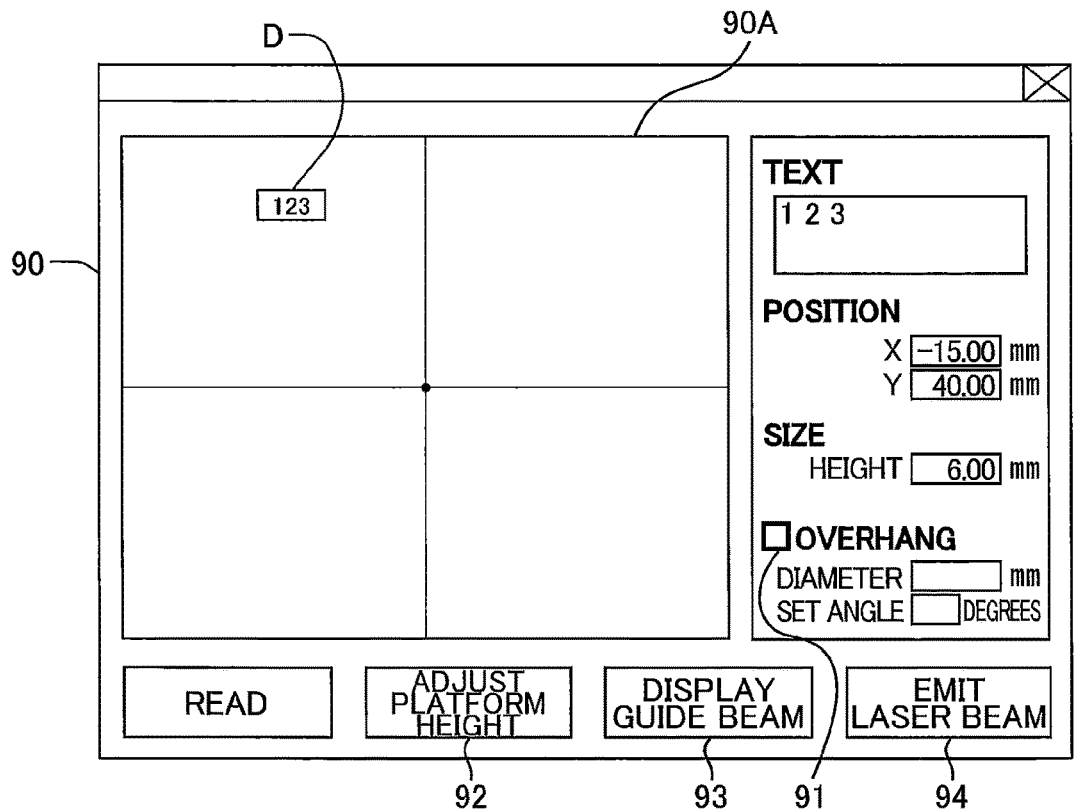
FIG. 15 is an example of a reception screen displayed on a display unit of a PC.

In S2 the CPU 51 acquires and saves the information for the machining pattern D in the RAM 53. As stated above, the reception screen 90 illustrated in FIG. 15 is displayed on the display unit 62. The user can specify a machining pattern D to be printed by making the input operation on this reception screen 90 via the input unit 61, and the PC 6 transmits information for the specified machining pattern D to the laser controller 5. The CPU 51 saves the information related to the machining pattern D received by the laser controller 5 in the RAM 53.

Figure 16:
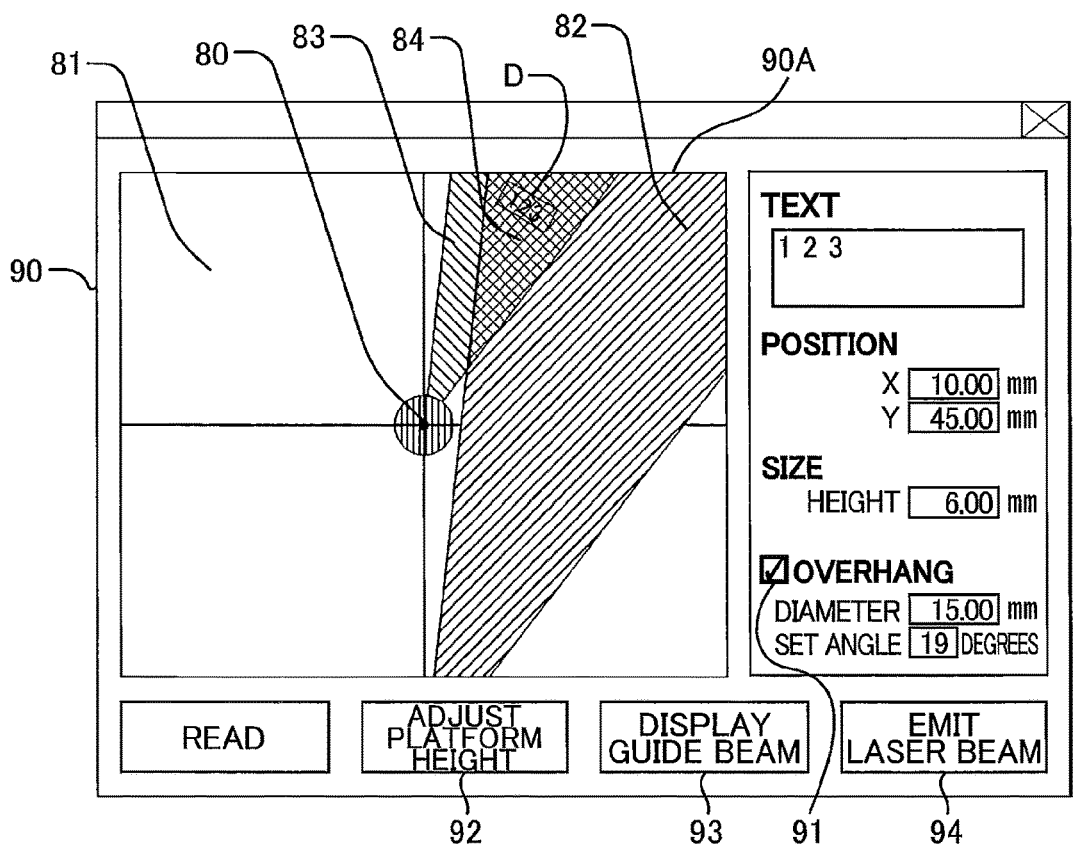
FIG. 16 is another example of the reception screen displayed on the display unit of the PC.

In the present embodiment, information for the machining pattern D includes text, the size of the text, and the coordinate position of the text relative to the support surface 23A. In the example of FIG. 15, the character string "123" has been inputted as the machining pattern D. The machining pattern D inputted via the reception screen 90 illustrated in FIG. 15 is displayed in a display section 90A which is the left portion of the reception screen 90 on the basis of the text, text size, and coordinates for the text relative to the support surface 23A. The display section 90A on the left side of FIGS. 15 and 16 is configured with an x-y coordinate system whose origin (0, 0) is the position in the focal plane z0 intersected by the laser beam P when the laser beam P is irradiated vertically downward from the laser head unit 3 toward the working platform 23. The x-axis is the left-right direction relative to the laser machining system 100 illustrated in FIGS. 1 to 3, and the y-axis is the front-rear direction relative to the laser machining system 100 illustrated in FIGS. 1 to 3. Up, down, right, and left in the display sections 90A of FIGS. 15 and 16 corresponds to rear, front, right, and left of the laser machining system 100 illustrated in FIGS. 1 to 3. The coordinate system in the display sections 90A of FIGS. 15 and 16 corresponds to a plan view of the support surface 23A on the working platform 23 of the laser machining system 100 illustrated in FIGS. 1 to 3. The center of the display sections 90A in FIGS. 15 and 16 corresponds to the origin (0, 0).

In the example of FIG. 15, the height "6.00 mm" has been also inputted as the size of the text. The CPU 51 calculates the height dimension La and width dimension Lb of the machining pattern D on the basis of the inputted character string and height. The CPU 51 calculates the height dimension La of the machining pattern D to be 6.00 mm and calculates the width dimension Lb on the basis of the length of the character string "123". The CPU 51 saves the calculated height dimension La and width dimension Lb for the machining pattern D in the RAM 53.

In S3 the CPU 51 determines whether a command for printing on the obscured part W11 has been received. Specifically, the CPU 51 determines whether the input unit 61 received an operation for inputting a check in a box 91 next to "OVERHANG" on the reception screen 90 displayed on the display unit 62 of the PC 6. In the example of FIG. 15, a check has not been inputted to the box 91 next to "OVERHANG," indicating that a command has not been inputted to print in the obscured part W11. In the example of FIG. 16, a check has been inputted to the box 91 next to "OVERHANG," indicating that a command has been given to print on the obscured part W11. When the CPU 51 determines that a command to print on the obscured part W11 has not been received, the CPU 51 advances to S10. When the CPU 51 determines that a command to print on the obscured part W11 has been received, the CPU 51 advances to S3.

In S4 the CPU 51 receives information related to the shape of the workpiece W and saves this information in the RAM 53. In S4 the CPU 51 instructs the PC 6 to display a reception screen 90 on the display unit 62 that includes the information related to the shape of the workpiece W. The information on the shape of the workpiece W is inputted via the input unit 61 of the PC 6. In the present embodiment, the inner diameter D1 for the workpiece W is inputted as the information related to the shape of the workpiece W. The CPU 51 saves the inner diameter D1 in the RAM 53 as information related to the shape of the workpiece W.

In S5 the CPU 51 calculates the height H from the point on the inner circumferential surface of the first part W1 nearest the support surface 23A (i.e., the edge W1A) to the inner circumferential surface of the second part W2 (i.e., the edge W2A) and saves this height H in the RAM 53. When the workpiece W is a hollow cylinder, the CPU 51 calculates the height H to be the inner diameter D1 and saves this height H in the RAM 53.

In S6 the CPU 51 executes a program for determining a printable region. In the program for determining a printable region the CPU 51 calculates the printable region 81 specifying set positions of the workpiece W at which the inputted machining pattern D having the height dimension La and width dimension Lb can be printed in the desired position on the workpiece W; and the unprintable region 80 specifying set positions of the workpiece W at which the machining pattern D cannot be printed at the desired position on the workpiece W. The CPU 51 executes this process under the assumption that the machining pattern D is arranged so that its height dimension is aligned in a direction pointing toward the origin (the axial direction of the workpiece W, in the present embodiment).

Next, steps in a process implemented by the program for setting a printable region (printable region setting process) will be described with reference to FIG. 9.

Figure 9:
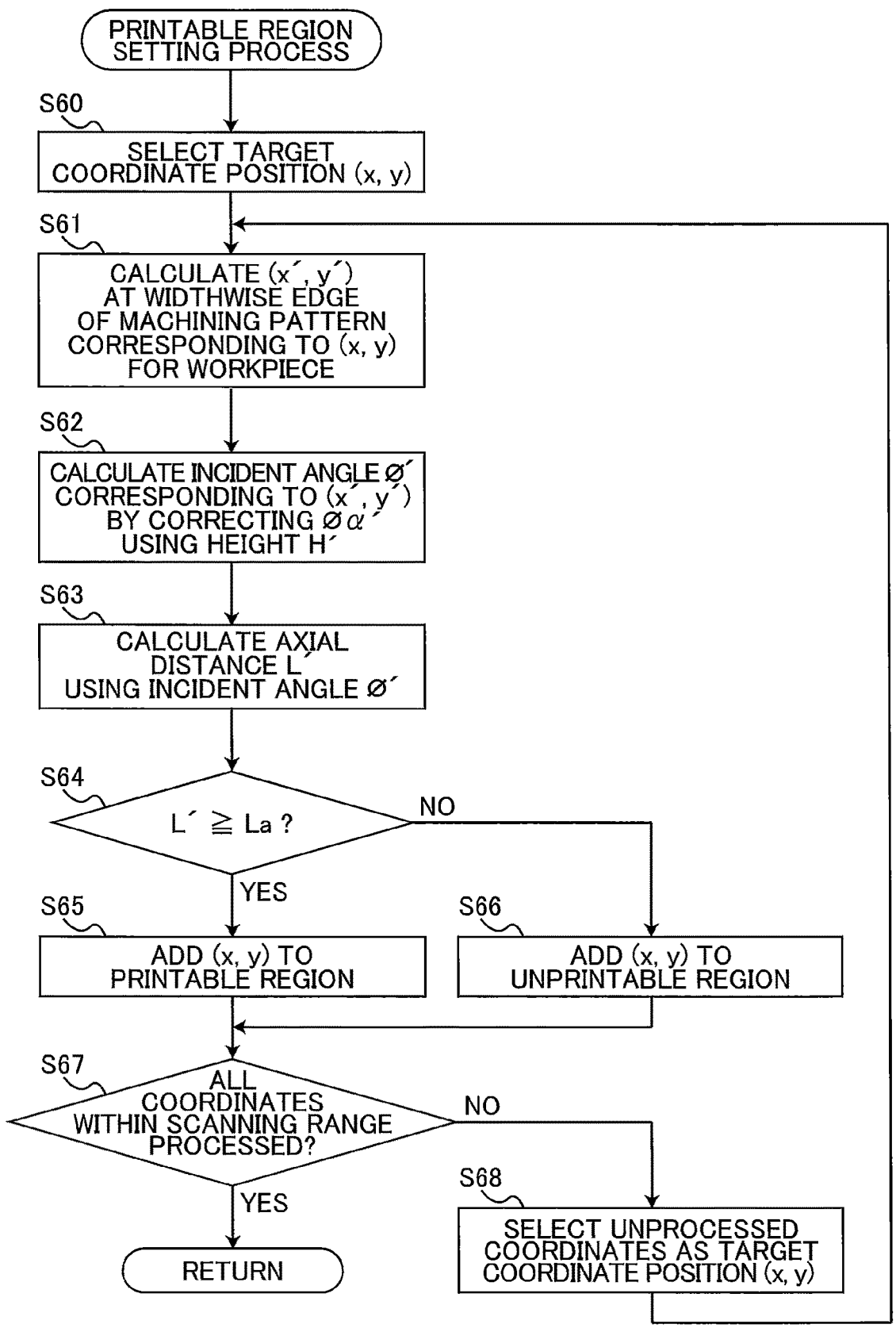
FIG. 9 is a flowchart illustrating steps in a printable region setting process.

In the printable region setting process of FIG. 9, the CPU 51 determines whether each coordinate position (x, y) included in the prescribed scanning range is positioned within the printable region. In S60 of FIG. 9, the CPU 51 selects a target coordinate position (x, y) from among all coordinates within the prescribed scanning range. For example, the CPU 51 selects a coordinate position (x1, y1) as the target coordinate position (x, y).

In S61 the CPU 51 calculates coordinates (x', y') corresponding to the target coordinate position (x, y), and saves the calculated coordinates (x', y') in the RAM 53. Here, the target coordinate position (x, y) indicates coordinates at which the workpiece W is positioned, and the coordinate position (x', y') indicates coordinates at which a widthwise edge of the machining pattern D is positioned.

Specifically, the CPU 51 calculates coordinates (x1', y1') at the width wise edge of the machining pattern D that correspond to the coordinate position (x1, y1) at which the workpiece W is positioned (see FIG. 6B). The CPU 51 calculates the coordinate position (x1', y1') for the point intersected by the bottom edge of the machining pattern D in the height direction and the widthwise edge when the machining pattern D is arranged such that the widthwise center point at the bottom edge of the machining pattern D in the height direction is positioned at the prescribed coordinate position (x1, y1) and the height dimension of the machining pattern D is aligned in a direction pointing toward the origin. Using the prescribed coordinate position (x1, y1) and the width dimension Lb of the machining pattern D, the CPU 51 calculates the coordinate position (x1', y1') to be the position shifted in the width direction from the coordinate position (x1, y1) by half the width dimension Lb, i.e., the length Lb/2. The CPU 51 saves the coordinate position (x1', y1') in the RAM 53.

In S62 the CPU 51 corrects an incident angle $\phi\alpha'$ from the laser head unit 3 to x- and y-coordinates corresponding to the coordinate position (x', y') to calculate the incident angle $\phi'$ at which the laser beam P emitted from the laser head unit 3 is incident on a coordinate position above the coordinate position (x', y') by a height H', and saves the incident angle $\phi'$.

Specifically, the CPU 51 corrects an incident angle $\phi 1\alpha'$ from the laser head unit 3 to x- and y-coordinates corresponding to the coordinate position (x1', y1') to calculate the incident angle $\theta 1'$ at which the laser beam P emitted from the laser head unit 3 is incident on a coordinate position above the coordinate position (x1', y1') by a height H'. The height H' is calculated as the distance from the first part W1 to the second part W2 at the coordinate position (x1', y1'). Specifically, the height H' is calculated from the height H between the first part W1 and second part W2 at coordinate position (x1, y1) and the width dimension Lb of the machining pattern D. When the workpiece W has a hollow cylindrical shape, as in the present embodiment, the height H' from the first part W1 to the second part W2 (more specifically, the height H' from the edge W1B of the inner circumferential surface of the first part W1 to the edge W2B of the inner circumferential surface of the second part W2) at the coordinate position (x1', y1') is found from the relational expression $(H'/2)^2=(H/2)^2-(Lb/2)^2$. The CPU 51 derives the incident angle $\phi\alpha'$ of the laser beam P emitted from the laser head unit 3 to the coordinate position (x1', y1') from correlations stored in the ROM 52 between x- and y-coordinates and incident angles $\phi\alpha$ from the laser head unit 3 to the x- and y-coordinates. Next, the CPU 51 reads a correction formula from the ROM 52 for correcting incident angles $\phi\alpha$ stored in the ROM 52 from the laser head unit 3 to x- and y-coordinates to incident angles $\phi$ from the laser head unit 3 to a position a prescribed distance above the x- and y-coordinates. The correction formula stores geometric relationships between incident angles $\phi\alpha$ from the laser head unit 3 to x- and y-coordinates and incident angles $\phi$ from the laser head unit 3 to positions prescribed distances above the x- and y-coordinates. The CPU 51 calculates the incident angle $\phi 1'$ from the laser head unit 3 to a position the height H' above the coordinate position (x1', y1') using the correction formula and the height H'. The CPU 51 saves the incident angle $\phi 1'$ calculated above in the RAM 53.

In S63 the CPU 51 calculates a maximum distance L' in the axial direction from the edge of the workpiece W at coordinate position (x', y') that the laser beam P can reach using the incident angle $\phi'$ calculated in S62, and saves the calculated value of the maximum distance as the axial length L' in the RAM 53. The axial length L' indicates a length in the axial direction of a reachable region that is reachable by the laser beam P.

Specifically, the CPU 51 calculates a maximum distance L1' in the axial direction from the edge of the workpiece W at coordinate position (x1', y1') that the laser beam P can reach using the incident angle $\phi 1'$ calculated above. The CPU 51 calculates the maximum distance L1' in the axial direction from the coordinate position (x1', y1') on the basis of the H' and $\phi 1'$ saved in the RAM 53 by using the expression $L1'=H'\times\tan\phi 1'$. The CPU 51 saves the calculated value of the maximum distance as the axial length L1' in the RAM 53.

In S64 the CPU 51 compares the axial length L' calculated in S63 to the height dimension La of the machining pattern D.

Specifically, the CPU 51 compares the axial length L1' calculated above to the height dimension La of the machining pattern D. The CPU 51 advances to S64 when the axial length L1' is greater than or equal to the height dimension La of the machining pattern D (S63: YES) and advances to S65 when the axial length L1' is less than the height dimension La of the machining pattern D (S63: NO).

In S65 the CPU 51 adds the target coordinate position (x, y) to the printable region 81 and advances to S66. In S66 the CPU 51 adds the target coordinate position (x, y) to the unprintable region 80 and advances to S66.

Specifically, in S65 the CPU 51 adds the coordinate position (x1, y1) to the printable region 81, whereas in S66 the CPU 51 adds the coordinate position (x1, y1) to the unprintable region 80.

In S67 the CPU 51 determines whether the axial length L' of the reachable region has been compared to the height dimension La of the machining pattern D for all coordinates within the prescribed scanning range. In other words, in S67 the CPU 51 determines whether all coordinates within the prescribed scanning range have been processed. The CPU 51 ends the program for setting a printable region when the axial lengths L' for all coordinates in the prescribed scanning range have been compared to the height dimension La of the machining pattern D and advances to S68 when there remain coordinates in the prescribed scanning range for which axial lengths L' have not been compared to the height dimension La of the machining pattern D.

In S68 the CPU 51 selects one of the unprocessed coordinates to be the target coordinate position (x, y), and returns to S61. Subsequently, the CPU 51 executes the process in S61 to S67 for the target coordinate position (x, y).

Specifically, the CPU 51 inputs a coordinate position (x2, y2) different from the processed coordinate position (x1, y1) as a target coordinate position and returns to S61. For example, a target coordinate position is selected at prescribed pitches in the x-direction and y-direction within the prescribed scanning range. Subsequently, the CPU 51 executes the process in S61 to S67 for the coordinate position (x2, y2).

After completing the printable region setting process (S6), in S7 of FIG. 8, the CPU 51 executes a process according to the program for setting a recommended printing region (recommended printing region setting process). That is, in S7 the CPU 51 executes the program for setting a recommended printing region. According to the recommended printing region setting process implemented by this program, the CPU 51 calculates a recommended region 84 specifying a set position for the workpiece W at which the desired position on the workpiece W can be printed along the prescribed set angle θa and at which the user can observe the desired position.

Next, steps in the recommended printing region setting process implemented by the program for setting a recommended printing region will be described with reference to FIG. 10.

Figure 10:
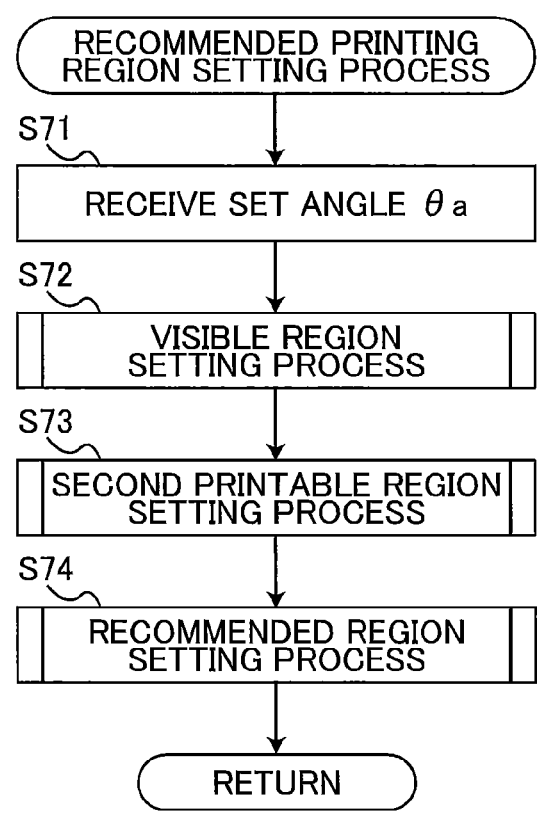
FIG. 10 is a flowchart illustrating steps in a recommended printing region setting process.

In S71 of FIG. 10 the CPU 51 receives the set angle θa of the workpiece W. As described above, the set angle θa is the angle formed by the opening direction that the opening W4 of the workpiece W faces with respect to the open area direction that the open area 215 in the main enclosure 21 faces. Specifically, in the present embodiment, the open area direction of the main enclosure 21 is the forward direction. Therefore, the set angle θa is the angle formed by the opening direction of the workpiece W with respect to the forward direction. The set angle θa for the workpiece W is inputted on the reception screen 90 via the input unit 61 of the PC 6. In the example of FIG. 16, 19 degrees has been inputted as the set angle θa. The PC 6 transmits information on the inputted set angle θa for the workpiece W to the laser controller 5. The CPU 51 stores the set angle θa for the workpiece W received from the PC 6 in the RAM 53.

In S72 the CPU 51 executes the program for setting a visible region. The CPU 51 calculates the set position of the workpiece W at which a user looking through the open area 215 of the main enclosure 21 can observe the laser beam P irradiated on the desired position of the workpiece W when the workpiece W is arranged at the inputted set angle θa.

Figure 11:
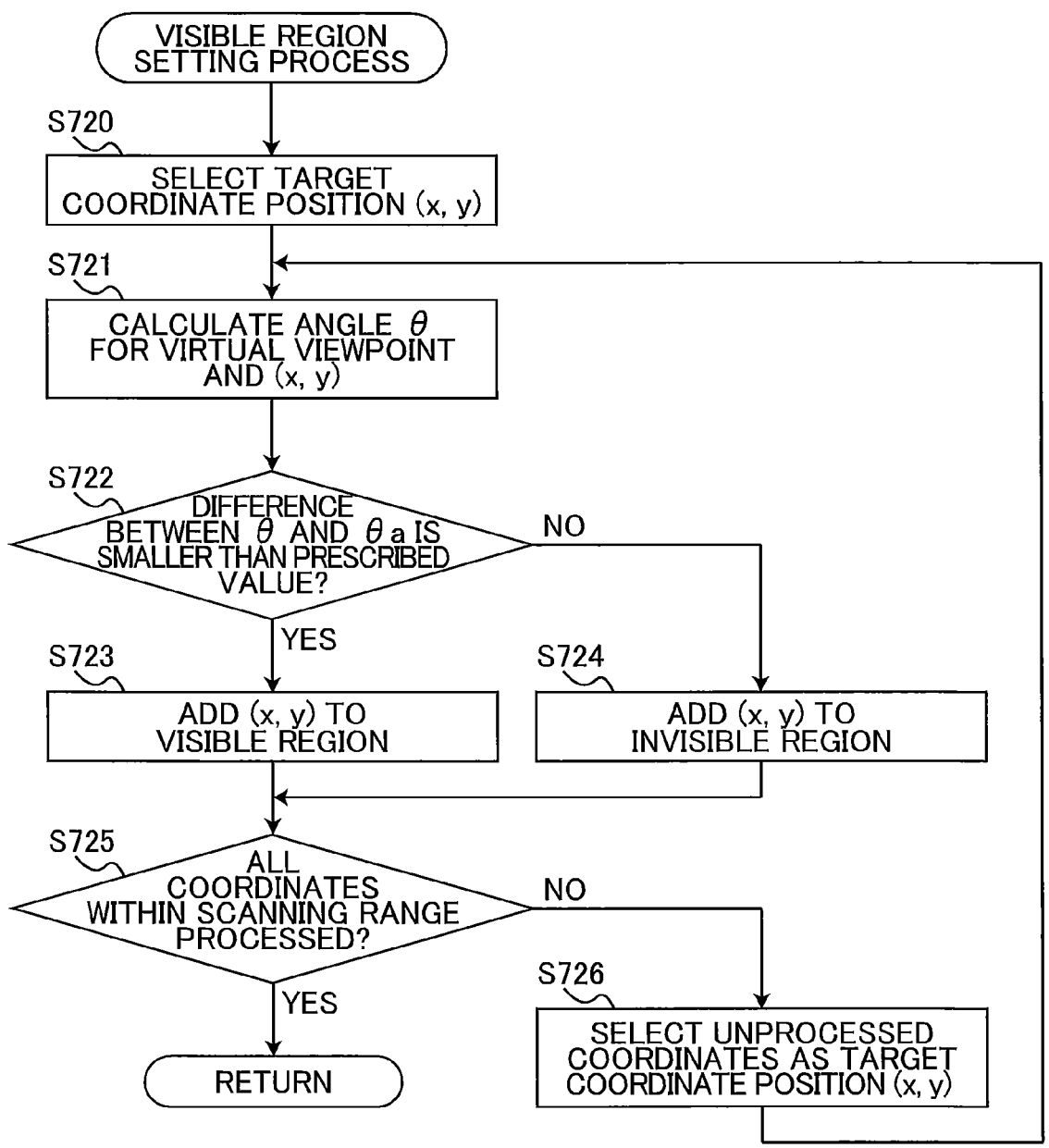
FIG. 11 is a flowchart illustrating steps in a visible region setting process.

Here, steps in the process implemented by the program for setting a visible region (visible region setting process) will be described with reference to FIG. 11.

In S720 the CPU 51 selects a target coordinate position (x, y) from among all coordinates within the prescribed scanning range. For example, the CPU 51 selects a coordinate position (x1, y1) as the target coordinate position (x, y).

In S721 the CPU 51 calculates an angle θ formed by a line passing through the virtual viewpoint K and the target coordinate position (x, y) with respect to a line following the direction in which the open area 215 of the main enclosure 21 faces. The CPU 51 saves the angle θ in the RAM 53.

Specifically, the CPU 51 calculates an angle θ1 formed by a line passing through the virtual viewpoint K and the coordinate position (x1, y1) with respect to the line following the open area direction of the main enclosure 21, i.e., forward direction. The CPU 51 saves the angle θ1 in the RAM 53.

In S722 the CPU 51 compares the calculated angle θ and set angle θa for the target coordinate position. The CPU 51 advances to S723 when the difference between the angle θ and set angle θa is smaller than a prescribed value and advances to S724 when the difference is greater than or equal to the prescribed value. Here, the difference between the angle θ and set angle θa is defined as the acute angle formed by the intersection of the line passing through the virtual viewpoint K and the target coordinate position (x, y) and a line following the direction in which the opening W4 of the workpiece W faces.

Specifically, the CPU 51 compares the angle θ1 and set angle θa for the coordinate position (x1, y1). The CPU 51 advances to S723 when the difference between the angle θ1 and set angle θa is smaller than a prescribed value and advances to S724 when the difference is greater than or equal to the prescribed value. Here, the difference between the angle θ1 and set angle θa is defined as the acute angle formed by the intersection of a line passing through the virtual viewpoint K and the coordinate position (x1, y1) and a line following the opening direction of the workpiece W.

In S723 the CPU 51 adds the target coordinate position (x, y) to a visible region 82 and advances to S725. In S724 the CPU 51 adds the target coordinate position (x, y) to a nonvisible region and advances to S725.

Specifically, in S723 the CPU 51 adds the coordinate position (x1, y1) to the visible region 82, whereas in S724 the CPU 51 adds the coordinate position (x1, y1) to the invisible region.

In S725 the CPU 51 determines whether the angles θ have been calculated for all coordinates within the prescribed scanning range and compared to the set angle θa. In other words, in S67 the CPU 51 determines whether all coordinates within the prescribed scanning range have been processed. If the angles θ for all coordinates has been compared to the set angle θa, the CPU 51 ends the program for setting a visible region. However, if there remain coordinates for which an angle θ was not compared to the set angle θa, the CPU 51 advances to S726.

In S726 the CPU 51 selects one of the unprocessed coordinates to be the target coordinate position (x, y) and returns to S721. The CPU 51 repeats the process in S721 to S725 for the target position (x, y).

Specifically, the CPU 51 inputs a coordinate position (x2, y2) different from the processed coordinate position (x1, y1) and returns to S721. For example, a target coordinate position is selected at prescribed pitches in the x-direction and y-direction within the prescribed scanning range. The CPU 51 repeats the process in S721 to S725 for the coordinate position (x2, y2).

After completing the visible region setting process (S72), in S73 of FIG. 10, the CPU 51 executes the program for setting a second printable region. In this process, the CPU 51 calculates set positions of the workpiece W at which the laser beam P can be irradiated on the desired position of the workpiece W when the workpiece W is arranged at the inputted set angle θa.

Figure 12:
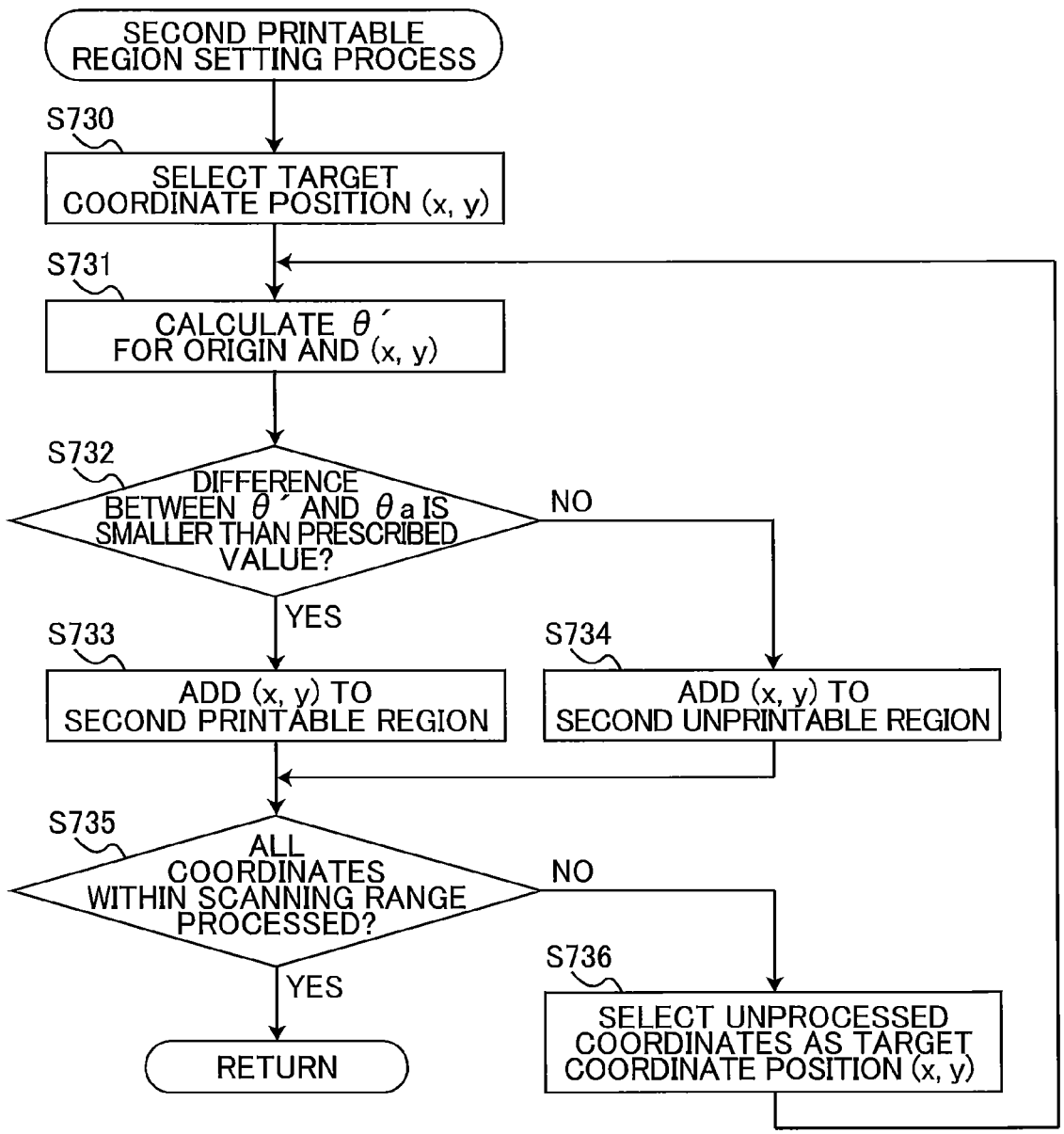
FIG. 12 is a flowchart illustrating steps in a second printable region setting process.

Here, steps in the process implemented by the program for setting a second printable region (second printable region setting process) will be described with reference to FIG. 12.

In S730 the CPU 51 selects a target coordinate position (x, y) from among all coordinates within the prescribed scanning range. For example, the CPU 51 selects a coordinate position (x1, y1) as the target coordinate position (x, y).

In S731 the CPU 51 calculates an angle φ' formed by a line passing through the origin (0, 0) and the target coordinate position (x, y) with respect to a line following the direction in which the open area 215 of the main enclosure 21 faces. The CPU 51 saves the angle φ' in the RAM 53.

Specifically, the CPU 51 calculates an angle θ1' formed by a line passing through the origin (0, 0) and the coordinate position (x1, y1) with respect to a line following the open area direction of the main enclosure 21, i.e., forward direction. The CPU 51 saves the angle θ1' in the RAM 53.

In S732 the CPU 51 compares the angle φ' calculated in S731 for the target coordinate position (x, y) and the set angle θa. The CPU 51 advances to S733 when the difference between the angle φ' and the set angle θa is smaller than a prescribed value and advances to S734 when the difference is greater than or equal to the prescribed value.

Specifically, the CPU 51 compares the angle θ1' calculated for the coordinate position (x1, y1) and the set angle θa. The CPU 51 advances to S733 when the difference between the angle θ1' and the set angle θa is smaller than a prescribed value and advances to S734 when the difference is greater than or equal to the prescribed value.

In S733 the CPU 51 adds the target coordinate position (x, y) to a second printable region 82 and advances to S735. In S734 the CPU 51 adds the target coordinate position (x, y) to a second unprintable region and advances to S735.

Specifically, in S733 the CPU 51 adds the coordinate position (x1, y1) to the second printable region 83, whereas in S734 the CPU 51 adds the coordinate position (x1, y1) to the second unprintable region.

In S735 the CPU 51 determines whether the angle φ' has been calculated for all coordinates in the prescribed scanning range and compared to the set angle θa. In other words, in S735 the CPU 51 determines whether all coordinates within the prescribed scanning range have been processed. If the angle φ' has been calculated for all coordinates and compared to the set angle θa, the CPU 51 ends the program for setting a second printable region. However, if there remain coordinates for which the angle θ1' has not been calculated for comparison to the set angle θa, the CPU 51 advances to S736.

In S736 the CPU 51 selects one of the unprocessed coordinates to be the target coordinate position (x, y), and returns to S731. For example, a target coordinate position is selected at prescribed pitches in the x-direction and y-direction within the prescribed scanning range. The CPU 51 repeats the process in S731 to S735 for the target coordinate position (x, y).

Specifically, the CPU 51 inputs the coordinate position (x2, y2) different from the processed coordinate position (x1, y1) and returns to S731. The CPU 51 repeats the process in S731 to S735 for the coordinate position (x2, y2).

After completing the second printable region setting process (S73), in S74 of FIG. 10, the CPU 51 executes the program for setting a recommended printing region. In this process, the CPU 51 calculates the recommended region 84 specifying a set position for the workpiece W at which the desired position on the workpiece W can be printed and at which the user can observe the desired position when the workpiece W is set at the inputted set angle θa.

Figure 13:
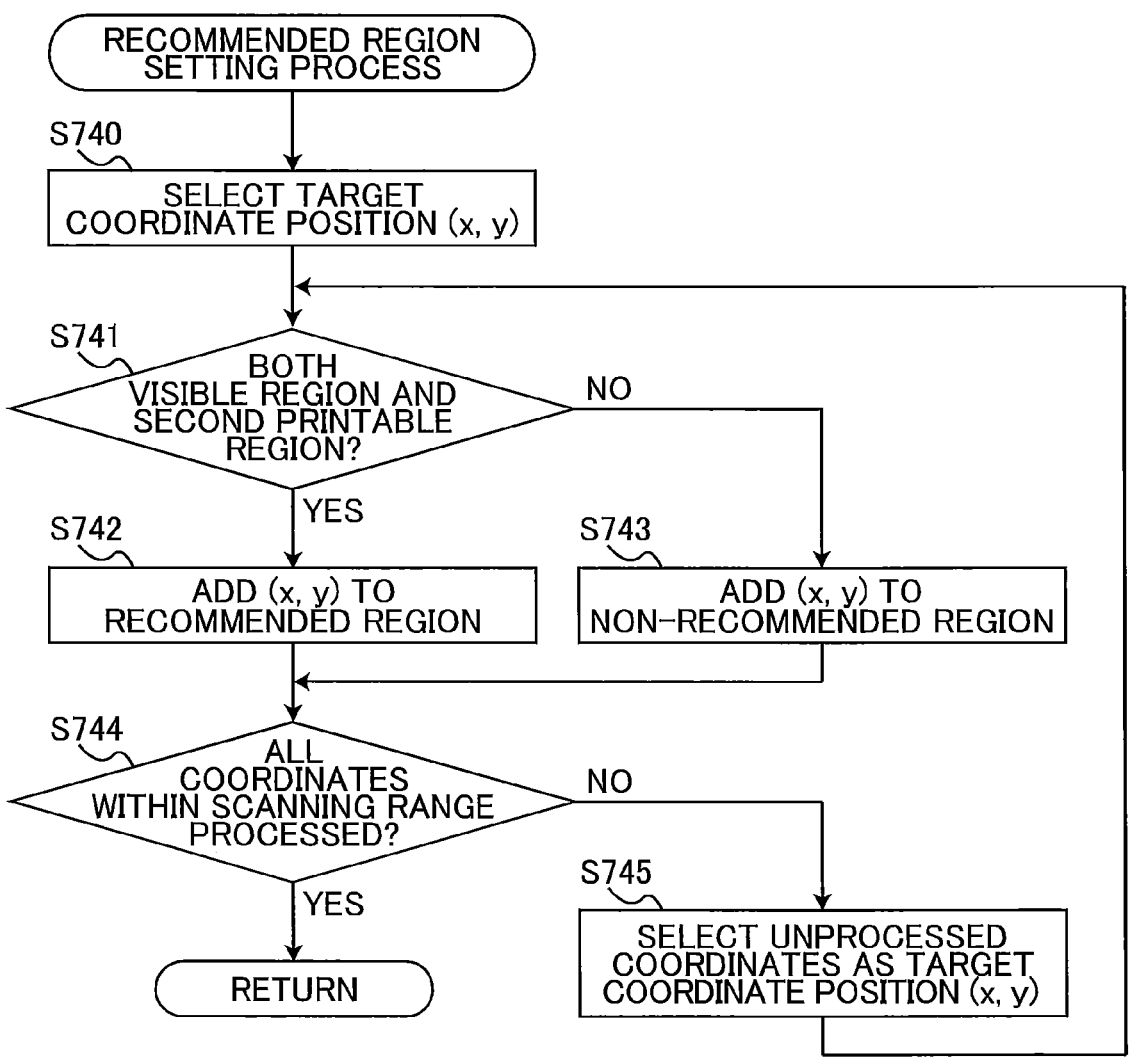
FIG. 13 is a flowchart illustrating steps in a recommended region setting process.
Figure 14:
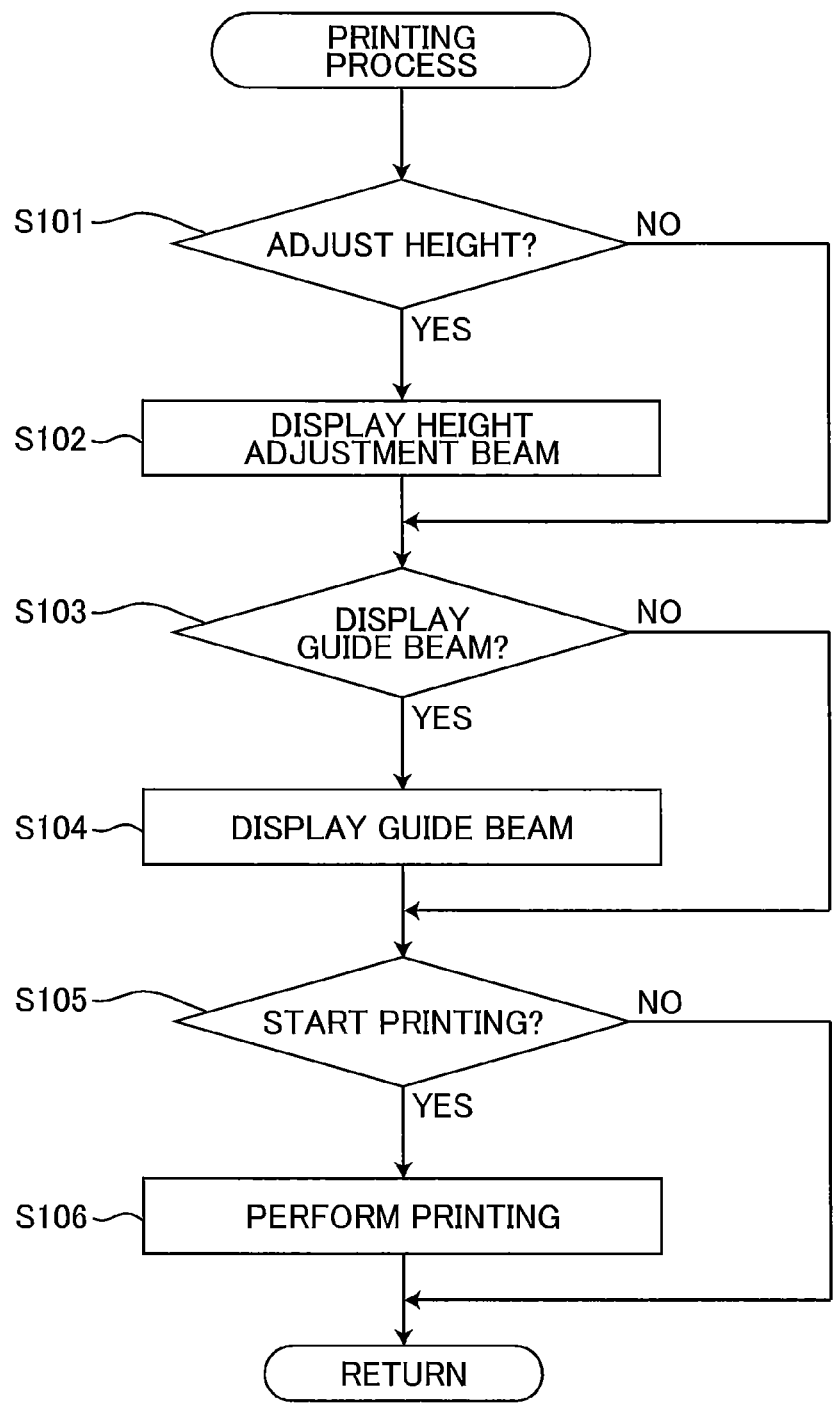
FIG. 14 is a flowchart illustrating steps in a printing process.

Here, steps in the process implemented by the program for setting a recommended printing region (recommended printing region setting process) will be described with reference to FIG. 13.

In S740 the CPU 51 selects a target coordinate position (x, y) from among all coordinates within the prescribed scanning range. For example, the CPU 51 selects a coordinate position (x1, y1) as the target coordinate position (x, y).

In S741 the CPU 51 determines whether the target coordinate position (x, y) is in both the visible region 82 and the second printable region 83. Specifically, the CPU 51 determines whether the coordinate position (x1, y1) is in both the visible region 82 and the second printable region 83.

The CPU 51 advances to S742 when the target coordinate position (x, y) is both the visible region 82 and second printable region 83 and advances to S743 when the target coordinate position (x, y) is either not in the visible region 82 or not in the second printable region 83.

Specifically, the CPU 51 advances to S742 when the coordinate position (x1, y1) is in both the visible region 82 and second printable region 83 and advances to S743 when the coordinate position (x1, y1) is either not in the visible region 82 or not in the second printable region 83.

In S742 the CPU 51 adds the target coordinate position (x, y) to the recommended region 84 and advances to S744. In S743 the CPU 51 adds the target coordinate position (x, y) to a non-recommended region and advances to S744.

Specifically, in S742 the CPU 51 adds the coordinate position (x1, y1) to the recommended region 84, whereas in S743 the CPU 51 adds the coordinate position (X1, Y1) to a non-recommended region.

In S744 the CPU 51 determines whether the process for determining whether coordinates are present in both the visible region 82 and second printable region 83 has been completed for all coordinates in the prescribed scanning range. In other words, in S744 the CPU 51 determines whether all coordinates within the prescribed scanning range have been processed. If the process for determining whether coordinates are present in the visible region 82 and second printable region 83 has been completed for all coordinates, the CPU 51 ends the program for setting a recommended printing region. However, if the process for determining whether coordinates are present in both the visible region 82 and second printable region 83 has not been completed for all coordinates, the CPU 51 advances to S745.

In S745 the CPU 51 selects one of the unprocessed coordinates to be the target coordinate position (x, y), and returns to S741. The CPU 51 repeats the process in S741 to S745 for the target coordinate position (x, y).

Specifically, the CPU 51 inputs the coordinate position (x2, y2) that is different from the processed coordinate position (x1, y1) and returns to S741. For example, a target coordinate position is selected at prescribed pitches in the x-direction and y-direction within the prescribed scanning range. The CPU 51 repeats the process in S741 to S745 for the coordinate position (x2, y2).

After completing the recommended printing region setting process in S74, the CPU 51 ends the program for setting a recommended printing region in S7.

After completing the recommended printing region setting process in S7, the CPU 51 advances to S8 of FIG. 8. In S8 the CPU 51 controls the PC 6 to display the printable region 81 on the display unit 62. Specifically, the CPU 51 transmits a command to the PC 6 to display the coordinate positions of the printable region 81 saved in the RAM 53 as the printable region 81. As illustrated in FIG. 16, the PC 6 displays the printable region 81 in the display section 90A on the reception screen 90 according to the command received from the CPU 51. The CPU 51 also controls the PC 6 to display the unprintable region 80 on the display unit 62. Specifically, the CPU 51 transmits a command to the PC 6 to display the coordinate positions for the unprintable region 80 saved in the RAM 53 as the unprintable region 80. As illustrated in FIG. 16, the PC 6 displays the unprintable region 80 in the display section 90A on the reception screen 90 according to the command received from the CPU 51.

In S9 the CPU 51 controls the PC 6 to display the recommended region 84 on the display unit 62. Specifically, the CPU 51 transmits a command to the PC 6 to display the coordinate positions for the recommended region 84 saved in the RAM 53 as the recommended region 84. As illustrated in FIG. 16, the PC 6 displays the recommended region 84 in the display section 90A on the reception screen 90 according to the command received from the CPU 51. The CPU 51 also controls the PC 6 to display the visible region 82 on the display unit 62. Specifically, the CPU 51 transmits a command to the PC 6 to display the coordinate positions for the visible region 82 saved in the RAM 53 as the visible region 82. As illustrated in FIG. 16, the PC 6 displays the visible region 82 in the display section 90A on the reception screen 90 according to the command received from the CPU 51. The CPU 51 also controls the PC 6 to display the second printable region 83 on the display unit 62. Specifically, the CPU 51 transmits a command to the PC 6 to display the coordinate positions of the second printable region 83 saved in the RAM 53 as the second printable region 83. As illustrated in FIG. 16, the PC 6 displays the second printable region 83 in the display section 90A on the reception screen 90 according to the command received from the CPU 51.

After completing the process of S9, the CPU 51 executes the printing program in S10. Steps in the process implemented by the printing program (printing process) will be described next with reference to FIG. 14.

In S101 the CPU 51 determines whether a height adjustment command was received. More specifically, the user can select an ADJUST PLATFORM HEIGHT button 92 in the reception screen 90 displayed on the display unit 62. When the user selects the ADJUST PLATFORM HEIGHT button 92 via the input unit 61, the PC 6 receives a height adjustment command. Upon receiving this command the PC 6 notifies the CPU 51, and the CPU 51 advances to S102. If a height adjustment command was not received, the CPU 51 advances to S103.

In S102 the CPU 51 displays a height adjustment beam. Specifically, the CPU 51 controls a height adjustment beam irradiation unit (not illustrated) to irradiate a height adjustment beam and controls the guide beam unit 38 to irradiate the guide beam Q. The guide beam Q is irradiated in a prescribed direction and the height adjustment beam is irradiated at an angle to intersect the guide beam Q at the focal point. By adjusting the height of the working platform 23 until the machining surface of the workpiece W meets the point of intersection between the height adjustment beam and the guide beam Q, the user can align the machining surface with the focal plane z0.

In S103 the CPU 51 determines whether a guide beam display command was received. Specifically, the user can select a DISPLAY GUIDE BEAM button 93 in the reception screen 90 displayed on the display unit 62. When the user selects the DISPLAY GUIDE BEAM button 93 via the input unit 61, the PC 6 receives a guide beam display command and notifies the CPU 51. Thus, when a guide beam display command has been received, the CPU 51 advances to S104. When a guide beam display command was not received, the CPU 51 advances to S105.

In S104, the CPU 51 controls the guide beam unit 38 to irradiate the guide beam Q and controls the galvano scanner 36 to scan the guide beam Q. The guide beam Q scanned by the galvano scanner 36 forms a guide beam pattern at the printing position. Accordingly, by adjusting the position of the workpiece W on the support surface 23A so that the machining surface of the workpiece W is aligned with the guide beam pattern, the user can position the workpiece W so that the guide beam pattern falls in the printable region 81 or the recommended region 84.

In S105 the CPU 51 determines whether a print command was received. Specifically, the user can select an EMIT LASER BEAM button 94 in the reception screen 90 displayed on the display unit 62. When the user selects the EMIT LASER BEAM button 94 via the input unit 61, the PC 6 receives a print command and notifies the CPU 51. The CPU 51 advances to S106 when a print command was received and quits the printing program when a print command has not been received.

In S106 the CPU 51 controls the galvano scanner 36 and pumping light unit 4 to scan the laser beam P. Thus, printing on the machining surface of the workpiece W is performed according to the machining pattern D.

After completing the printing process in S10 of FIG. 8, in S11 the CPU 51 determines whether a quit command was received. While a quit command has not been received, the CPU 51 returns to S1 and repeats the process described above. When a quit command was received, the CPU 51 ends the laser machining program.

As described above, in S1 of FIG. 8 the CPU 51 accepts edits for the machining pattern D. The information related to the machining pattern D is inputted via the input unit 61 of the PC 6, and the PC 6 transmits the information related to the inputted machining pattern D to the laser controller 5. The CPU 51 of the laser controller 5 saves the inputted information in the RAM 53. At this time, the unprintable region 80, printable region 81, visible region 82, second printable region 83, and recommended region 84 are displayed on the display unit 62. The user can made the user operation on the input unit 61 to input instructions for arranging the position of the workpiece W in the printable region 81 or recommended region 84 so that all the machining pattern D can be printed in a desired position on the workpiece W. Further, when the workpiece W is arranged in an unprintable region at which all or part of the machining pattern D cannot be printed in a desired position on the workpiece W at this time, the guide beam unit 38 may be configured to not irradiate the guide beam Q to display the guide beam pattern for the portion of the machining pattern D which cannot be printed. Accordingly, the user can easily recognize when the workpiece W is positioned in an unprintable region and, hence, all or part of a machining pattern D is unprintable in a desired position on the workpiece W. Further, the CPU 51 may shift the position of the machining pattern D into a region at which the entire machining pattern D is printable when determining that the workpiece W falls in the unprintable region 80 and all or part of the machining pattern D received from the user is unprintable. Thereafter, the CPU 51 displays the guide beam pattern in the process of S104 according to the machining pattern D and its angle and position set in S1. The user adjusts the workpiece W so that the desired printing position on the workpiece W is aligned with the guide beam pattern displayed in S104. In other words, the user can arrange the workpiece W having the obscured part W11 at the coordinates for the position of the printable region 81 or recommended region 84.

In the embodiment described above, the laser machining system 100 is an example of the laser machining apparatus of the present disclosure. The working platform 23 is an example of the workpiece setting portion of the present disclosure, and the support surface 23A is an example of the setting surface of the present disclosure. The laser oscillation unit 32 is an example of the laser beam emission device of the present disclosure, the galvano scanner 36 is an example of the scanner of the present disclosure, and the guide beam unit 38 is an example of the guide beam emission device of the present disclosure. The display unit 62 is an example of the display of the present disclosure. The CPU 51 is an example of the controller of the present disclosure, and the ROM 52 and RAM 53 are an example of the memory of the present disclosure. The main enclosure 21 is an example of the casing of the present disclosure, the door 22 is an example of the door of the present disclosure, and the open area 21S is an example of the window of the present disclosure.

The vertical direction is an example of the first direction of the present disclosure, the axial direction of the workpiece W is an example of the second direction of the present disclosure, and the open area direction is an example of the third direction of the present disclosure. The set angle θa is an example of the set angle of the present disclosure. The unprintable region 80 is an example of the unmachinable position of the present disclosure. The visible region 82 is an example of the visible position of the present disclosure, the second printable region 83 is an example of the machinable position of the present disclosure, and the recommended region 84 is an example of the recommended position of the present disclosure. The height dimension La of the machining pattern D is an example of the first length of the present disclosure, and the width dimension Lb of the machining pattern D is an example of the fourth length of the present disclosure. The height H and H' are an example of the second length of the present disclosure. The axial lengths L and L' are an example of the third length of the present disclosure.

In the embodiment described above, a mode for calculating and displaying the unprintable region 80 and recommended region 84 was described for a workpiece W having a hollow cylindrical shape, but the spirit of the disclosure is still applicable when calculating and displaying the unprintable region 80 and recommended region 84 for a workpiece having a different shape. For example, the disclosure may be used for printing the inner surface of a workpiece in the shape of a hollow square prism.

Further, the edge of the hollow cylindrical workpiece W defining the opening in the workpiece W in the embodiment described above is shaped such that the first part W1 and second part W2 at the edge of the opening are at the same position in the direction that the opening faces (axial direction). However, the present disclosure may be applied to a workpiece whose first part W1 and second part W2 at the edge of the opening are at different positions relative to the direction that the opening in the workpiece faces (axial direction). For example, when the workpiece is formed with a first part W1 protruding farther in the axial direction than the second part W2, the obscured part may be defined as the portion of the first part W1 overlapped vertically by the second part W2. Alternatively, if the workpiece is formed with a second part W2 protruding farther in the axial direction than the first part W1, the obscured part can be defined as the portion of the first part W1 overlapped vertically by the second part W2. In order to determine whether a prescribed machining pattern can be printed in the obscured part, the CPU 51 can calculate a length L" by subtracting the distance between the edge of the second part W2 at the open end and the edge of the first part W1 at the open end from the axial length L calculated as described in the embodiment described above and comparing this length L" to the height dimension La of the machining pattern D.

Further, while the present embodiment described a mode for calculating and displaying the unprintable region 80, printable region 81, visible region 82, second printable region 83, and recommended region 84, the CPU 51 need not calculate and display all of these regions. For example, the CPU 51 may simply calculate and display the unprintable region 80.

Further, the embodiment describes a mode in which the CPU 51 of the laser controller 5 calculates the unprintable region 80, printable region 81, visible region 82, second printable region 83, and recommended region 84, but these calculations need not be performed by the CPU 51 of the laser controller 5. For example, the PC 6 may have a CPU 65, and the CPU 65 of the PC 6 may calculate the unprintable region 80, printable region 81, visible region 82, second printable region 83, and recommended region 84.

In the process of the present embodiment implemented by the program for setting a printable region (S6), the CPU 51 calculates the unprintable region 80 and printable region 81 by comparing the height dimension La of the machining pattern D in the axial direction to the axial length L' of the region reachable by the laser beam P. The axial length L' is calculated on the basis of the inner diameter D1 in the portion of the inner circumferential surface of the hollow cylindrical workpiece W that is shifted half the length of the width dimension Lb for the machining pattern D from the point on the inner circumferential surface nearest the support surface 23A.

However, the CPU 51 may instead calculate the unprintable region 80 and printable region 81 by comparing the height dimension La of the machining pattern D in the axial direction to the maximum distance L1 calculated on the basis of the inner diameter D1 in the region on the inner circumferential surface of the hollow cylindrical workpiece W that is nearest the support surface. By calculating the unprintable region 80 and printable region 81 in this way, the CPU 51 can determine whether the height dimension La of the machining pattern D in the axial direction can be printed at least in the area on the inner circumferential surface of the workpiece W nearest the support surface. Although this method is less precise than a method using information on the width dimension Lb of the machining pattern D, the process is simpler to perform than a process using information on the width dimension Lb.

For example, when printing on the inner surface of a workpiece W having a shape such as a square prism shape whose first part and second part both have constant heights along a direction parallel to the support surface, the CPU 51 can determine whether the entire machining pattern D is printable or not printable simply by calculating the axial length L at the coordinate position corresponding to the center in a direction orthogonal to the axis and parallel to the support surface. In a workpiece W having a hollow cylindrical shape, the height position of the obscured part varies in the direction orthogonal to the axis and parallel to the support surface. However, the laser machining system 100 can print the workpiece at differing positions in the height direction i.e., the Z direction, provided that the positions fall within the depth of focus determined by the material composition of the workpiece, the type of lens used, and the like.

In addition to the embodiment described above, the printable region may be set with consideration for the width dimension Lb of the machining pattern D. As an example, the CPU 51 acquires the width dimension Lb of the machining pattern D and calculates the set position for the machining pattern D at which the entire width dimension Lb of the machining pattern D will fit inside the second printable region. The CPU 51 then sets the printable region to the set position of the machining pattern D at which the entire width dimension Lb is accommodated. With this method, the CPU 51 can calculate a region in which the entire machining pattern D is printable, even when the machining pattern D has a long width dimension Lb.

What is claimed is:

1. A laser machining apparatus comprising:
   a workpiece setting portion having a setting surface on which a workpiece is set;
   a laser beam emission device configured to emit a laser beam for machining the workpiece;
   a scanner configured to scan the laser beam emitted from the laser beam emission device in directions including a first direction, the workpiece having a first part and a second part, the workpiece set on the setting surface having one end portion in a second direction different from the first direction, an opening being formed in the workpiece in a direction opposite the second direction along at least the one end portion, the first part being exposed through the opening, the second part hindering the laser beam scanned in the first direction from reaching the first part;
   a display; and
   a controller configured to perform:
   (a) acquiring shape data indicative of a shape of the workpiece;
   (b) acquiring machining pattern data indicative of a machining pattern to be machined on the first part;
   (c) acquiring a first length of the machining pattern in the second direction on the basis of the machining pattern data;
   (d) calculating an unmachinable position on the setting surface using the first length and the shape data, the unmachinable position resulting from the second part hindering the laser beam reaching the first part, at least a part of the machining pattern being unmachinable on the first part in a state where the workpiece is set on the unmachinable position; and
   (e) displaying the unmachinable position on the display.

2. The laser machining apparatus according to claim 1, wherein the (d) calculating comprises:
   (d1) calculating a second length of the opening in the first direction using the shape data; and
   (d2) calculating the unmachinable position using the first length and the second length.

3. The laser machining apparatus according to claim 2, further comprising a memory configured to store a plurality of emission angles corresponding to respective ones of a plurality of positions on the setting surface, the laser beam scanned toward one of the plurality of positions forming corresponding one of the plurality of emission angles with respect to the first direction,
   wherein the (d2) calculating comprises:
   (d21) acquiring an emission angle corresponding to a prescribed position from among the plurality of emission angles stored in the memory;
   (d22) calculating a third length using the second length and the emission angle, the third length being a length in the second direction on the first part that is reachable by the laser beam in a state where the workpiece is set on the prescribed position;
   (d23) in response to determining that the third length is smaller than the first length, setting the prescribed position to the unmachinable position; and
   (d24) in response to determining that the third length is greater than or equal to the first length, setting the prescribed position to a machinable position, all of the machining pattern being machinable on the first part without hindrance of the laser beam by the second part in a state where the workpiece is set on the machinable position.

4. The laser machining apparatus according to claim 3, wherein the (d2) calculating further comprises (d25) correcting the emission angle in accordance with the second height, and
   wherein the (d22) calculating calculates the third length using the corrected emission angle.

5. The laser machining apparatus according to claim 4, wherein the controller is configured to further perform (f) acquiring a fourth length of the machining pattern in a third direction perpendicular to the second direction from the machining pattern data, and
   wherein the (d1) calculating calculates the second length using the shape data and the fourth length.

6. The laser machining apparatus according to claim 3, wherein the workpiece has a hollow cylindrical shape having an inner diameter,
   wherein the (a) acquiring acquires the inner diameter of the workpiece, and
   wherein the (d1) calculating calculates the second length using the inner diameter and the fourth length.

7. The laser machining apparatus according to claim 1, further comprising:
   a casing configured to accommodate therein the workpiece, the casing having a window open in a third direction; and
   a door configured to open and close the window,
   wherein the controller is configured to further perform:
   (g) acquiring a set angle of the workpiece, the set angle indicating an angle formed between the second direction and the third direction;
   (h) calculating a visible position on the setting surface using the set angle, all of the machining pattern machined on the first part being visible from a reference point through the window in a state where the workpiece is disposed on the visible position with the set angle, a reference point being a virtual viewpoint outside the casing;
   (i) calculating a machinable position on the setting surface, all of the machining pattern being machinable on the first part without hindrance of the laser beam by the second part in a state where the workpiece is disposed on the machinable position with the set angle;

(j) determining a recommended position on the setting surface, the recommended position being both the visible position and the machinable position; and (k) displaying the recommended position on the display.

8. The laser machining apparatus according to claim 7, wherein the (h) calculating comprises:

(h1) calculating a first angle formed by a first line and the second direction, the first line passing through a first position on the setting surface and the reference point; and (h2) in response to determining that the first angle is smaller than a first threshold angle, setting the first position to the visible position, and wherein the (i) calculating comprises:

(i1) calculating a second angle formed by a second line and the second direction, the second line passing through a second position on the setting surface and a third position, the laser beam scanned in the first direction reaching the third position; and (i2) in response to determining that the second angle is smaller than a second threshold angle, setting the second position to the machinable position.

9. The laser machining apparatus according to claim 1, further comprising a guide beam emission device configured to emit a guide beam, and wherein the controller is configured to further perform:

(l) acquiring position data of the machining pattern;

(m) determining whether the machining pattern is machinable on the first part using the position data and the unmachinable position;

(n) in response to determining that the machining pattern is machinable, displaying the machining pattern based on the position data; and (o) controlling the scanner and the guide beam emission device to scan the guide beam according to the position data.

* * * * *